United States Patent
Inagaki et al.

(10) Patent No.: US 8,352,137 B2
(45) Date of Patent: Jan. 8, 2013

(54) CONTROL APPARATUS

(75) Inventors: Nobuaki Inagaki, Nishio (JP); Hiroya Ueno, Wolfsburg (DE); Kohei Tsuda, Anjo (JP); Eiji Moriyama, Okazaki (JP); Hiroshi Tsutsui, Nishio (JP)

(73) Assignee: Aisin AW Co., Ltd., Anjo (JP)

( * ) Notice: Subject to any disclaimer, the term of this patent is extended or adjusted under 35 U.S.C. 154(b) by 460 days.

(21) Appl. No.: 12/654,502

(22) Filed: Dec. 22, 2009

(65) Prior Publication Data

US 2010/0168969 A1    Jul. 1, 2010

(30) Foreign Application Priority Data

Dec. 26, 2008 (JP) .................... 2008-333880

(51) Int. Cl.
  *G06F 7/00*  (2006.01)
(52) U.S. Cl. .................. 701/55; 701/51; 477/5
(58) Field of Classification Search ............ 701/22, 701/51, 55; 477/5, 109, 143; 180/65.285
  See application file for complete search history.

(56) References Cited

U.S. PATENT DOCUMENTS

| | | | | |
|---|---|---|---|---|
| 5,820,517 | A * | 10/1998 | Saito et al. ............ | 477/109 |
| 5,839,989 | A * | 11/1998 | Saito et al. ............ | 477/143 |
| 6,846,265 | B2 | 1/2005 | Yamamoto et al. | |
| 2003/0186778 | A1* | 10/2003 | Yamamoto et al. ...... | 477/5 |
| 2004/0053745 | A1* | 3/2004 | Sakamoto et al. ........ | 477/121 |
| 2005/0096182 | A1 | 5/2005 | Ohta | |
| 2006/0108163 | A1 | 5/2006 | Kitano et al. | |
| 2007/0278022 | A1* | 12/2007 | Tanishima .............. | 180/65.2 |

FOREIGN PATENT DOCUMENTS

| JP | A 3-260464 | 11/1991 |
|---|---|---|
| JP | A 10-184896 | 7/1998 |
| JP | A-2003-278910 | 10/2003 |
| JP | A 2005-98314 | 4/2005 |
| JP | A 2005-133782 | 5/2005 |
| JP | A 2006-151217 | 6/2006 |
| JP | A 2006-153041 | 6/2006 |
| JP | A 2007-198564 | 8/2007 |

OTHER PUBLICATIONS

International Search Report dated Dec. 28, 2009 for U.S. National Phase Application No. PCT/JP2009/069126.

* cited by examiner

*Primary Examiner* — Helal A Algahaim
(74) *Attorney, Agent, or Firm* — Oliff & Berridge, PLC

(57) ABSTRACT

A control apparatus includes a differential speed acquisition unit that acquires a differential speed representing a difference in speed between an input side drivingly connected to the input member of the fluid coupling and an output side drivingly connected to the transmission; a state determination unit that determines a shift speed in the transmission and an operating state of the direct connection clutch based on an accelerator opening and a vehicle speed of a vehicle; and a direct connection control unit that engages, if the differential speed is equal to or less than a predetermined engagement permitting threshold value when the state determination unit determines an upshift of the shift speed and a transition from a disengaged state to an engaged state of the direct connection clutch in a condition in which the accelerator opening is decreasing, the direct connection clutch regardless of an upshift operation of the shift speed.

9 Claims, 9 Drawing Sheets

CONTROL APPARATUS

CROSS-REFERENCE TO RELATED APPLICATION

The disclosure of Japanese Patent Application No. 2008-333880 filed on Dec. 26, 2008 including the specification, drawings and abstract is incorporated herein by reference in its entirety.

BACKGROUND

The present invention relates to a control apparatus for controlling a vehicle drive system that has a fluid coupling including a direct connection clutch, and a transmission, and that outputs rotation of an input member that is drivingly connected to an engine and a rotating electric machine to an output member.

In recent years, hybrid vehicles using both an engine and a rotating electric machine as driving force sources to achieve improved fuel economy and reduced exhaust emissions of the engine are put into practical use. As an example of a vehicle drive system used for such a hybrid vehicle, Japanese Patent Application Publication No. JP-A-2003-278910 detailed below, for example, describes a vehicle drive system that has a fluid coupling including a direct connection clutch, and a transmission, and outputs rotation of an input member that is drivingly connected to an engine and a rotating electric machine to an output member via the fluid coupling and the transmission.

In the vehicle drive system described in Japanese Patent Application Publication No. JP-A-2003-278910, when an accelerator opening is brought into a fully closed position as operated according to the intention of the driver of the vehicle, a control apparatus controls the direct connection clutch into an engaged state, regardless of whether the direct connection clutch is in the engaged state or a disengaged state. At the same time, a shift speed of the transmission is upshifted in order to keep energy consumed by engine braking low by decreasing the speed of the engine and improve energy regeneration efficiency. As such, a situation can occur in which an upshift operation of the shift speed is requested at timing substantially equal to timing at which an engagement operation of the direct connection clutch is requested.

Under these circumstances, the vehicle drive system described in Japanese Patent Application Publication No. JP-A-2003-278910 is controlled such that the direct connection clutch is kept in the disengaged state while the upshift operation of the shift speed is being performed and the direct connection clutch is engaged after the upshift operation is completed. This reduces impact on the vehicle caused by shifting (shift shock).

SUMMARY

In general, if the accelerator opening is reduced as operated according to the intention of the driver of the vehicle, it is likely that, for example, a braking operation will thereafter be performed for braking the vehicle. In such a case, in a hybrid vehicle having both an engine and a rotating electric machine as driving force sources, a regenerative operation is performed as the vehicle is decelerated. To improve regeneration efficiency at this time, it should be effective to maintain a state in which a large torque is transmitted to the rotating electric machine as long as possible. In this respect, the control provided by the control apparatus described in Japanese Patent Application Publication No. JP-A-2003-278910 has the following problem; specifically, the direct connection clutch is engaged only after the upshift operation is completed; which requires a predetermined period of time before the direct connection clutch is in a completely engaged state, resulting in reduced regeneration efficiency.

The present invention has been made in view of the above-described problem and it is an object of the present invention to provide a technique that allows regeneration efficiency to be improved when the upshift operation of the shift speed and bringing the direct connection clutch into the engaged state are executed.

To achieve the foregoing object, a control apparatus according to an aspect of the present invention controls a vehicle drive system that has a fluid coupling including a direct connection clutch, and a transmission and outputs rotation of an input member that is drivingly connected to an engine and a rotating electric machine to an output member. The control apparatus is characterized by including: a differential speed acquisition unit that acquires a differential speed representing a difference in speed between an input side drivingly connected to the input member of the fluid coupling and an output side drivingly connected to the transmission; a state determination unit that determines a shift speed in the transmission and an operating state of the direct connection clutch based on an accelerator opening and a vehicle speed of a vehicle; and a direct connection control unit that engages, if the differential speed is equal to or less than a predetermined engagement permitting threshold value when the state determination unit determines an upshift of the shift speed and a transition from a disengaged state to an engaged state of the direct connection clutch in a condition in which the accelerator opening is decreasing, the direct connection clutch regardless of an upshift operation of the shift speed.

With this structure, the direct connection control unit engages the direct connection clutch regardless of the upshift operation of the shift speed in the condition in which the accelerator opening is decreasing when the state determination unit determines the upshift of the shift speed and the transition from the disengaged state to the engaged state of the direct connection clutch. This allows the direct connection clutch to be engaged before a shifting operation is completed. This achieves at an early stage a condition in which torque transmitted from the output member is directly transmitted to the rotating electric machine via the direct connection clutch (negative torque outputted from the rotating electric machine is directly transmitted to the output member via the direct connection clutch). A condition of performing regeneration at a high efficiency can therefore be achieved at an early stage when the upshift operation of the shift speed and the transition of the direct connection clutch to the engaged state are performed, achieving an improved regeneration efficiency.

Engaging the direct connection clutch may generally result in impact by engagement (engagement shock). With this structure, however, the direct connection control unit engages the direct connection clutch only if the differential speed is equal to or less than a predetermined engagement permitting threshold value. This inhibits the impact by engagement of the direct connection clutch on the vehicle from occurring even if the direct connection clutch is engaged regardless of the completion of the upshift operation of the shift speed.

Accordingly, in accordance with the aspect of the present invention, regeneration efficiency can be improved, while inhibiting the impact by engagement of the direct connection clutch on the vehicle from occurring, when the upshift operation of the shift speed and the transition of the direct connection clutch to the engaged state are performed.

Preferably, the direct connection control unit is structured to engage the direct connection clutch after the upshift operation of the shift speed is completed, if the state determination unit determines the upshift of the shift speed and the transition from the disengaged state to the engaged state of the direct connection clutch in a condition in which the accelerator opening is constant or increasing.

In the condition in which the accelerator opening is constant or increasing, it is considered that a driver is not likely thereafter to perform a braking operation or otherwise operate for braking the vehicle, which lessens the necessity to achieve at an early stage a condition in which regeneration can be performed at a high efficiency. With this structure, therefore, variations in torque involved in the upshift operation of the shift speed during the shifting operation are, in such cases, transmitted to the input member via the fluid coupling, so that impact on the vehicle caused by the shifting can be inhibited.

Preferably, the direct connection control unit is structured to cause a preliminary operation in which the direct connection clutch is set into an engageable state and an engagement operation in which the direct connection clutch is engaged after the preliminary operation to be performed.

With this structured, the preliminary operation in which the direct connection clutch is set into the engageable state is performed before the engagement operation in which the direct connection clutch is engaged. This allows the direct connection clutch to be engaged promptly whenever necessary.

Preferably, the direct connection control unit is structured to cause, if the differential speed is equal to or less than a predetermined engagement permitting threshold value when the state determination unit determines the upshift of the shift speed and the transition from the disengaged state to the engaged state of the direct connection clutch in a condition in which the accelerator opening is decreasing, the preliminary operation to be performed substantially at the same time that the state determination unit determines the transition from the disengaged state to the engaged state of the direct connection clutch.

With this structure, the direct connection clutch can be set into the engageable state at an even earlier stage. As a result, the direct connection clutch can be engaged at an early stage, which achieves at an even earlier stage a condition in which regeneration can be performed at a high efficiency.

Preferably, the engagement permitting threshold value is structured to be set to a value of the differential speed that results in an impact when the direct connection clutch is engaged that is smaller than an impact on the vehicle generated by decreasing the accelerator opening.

With this structure, even if the direct connection clutch is engaged regardless of the completion of the shifting operation in the condition in which the accelerator opening is decreasing when the state determination unit determines the upshift of the shift speed and the transition from the disengaged state to the engaged state of the direct connection clutch, the impact on the vehicle generated as a result of the engagement operation of the direct connection clutch can be indistinguished from the impact on the vehicle generated by decreasing the accelerator opening.

It is preferably structured that the direct connection control unit outputs a direct connection control command signal for engaging the direct connection clutch and the direct connection control command signal is a predetermined reference waveform defined by one or two or more variables, the reference waveform having a preliminary filling phase for filling an engagement side oil chamber of the direct connection clutch with a hydraulic fluid and a pressure boost engagement phase for engaging the direct connection clutch by boosting a hydraulic pressure of the hydraulic fluid.

With this structure, the preliminary operation of the direct connection clutch is performed according to the preliminary filling phase and the engagement operation is performed according to the pressure boost engagement phase of the direct connection control command signal, which allows the direct connection clutch to be engaged appropriately. At this time, the direct connection control command signal is generated by defining the predetermined reference waveform by one or two or more variables. Accordingly, the waveform of the direct connection control command signal can be optimized to have an appropriate shape according to vehicle conditions, thereby allowing the direct connection clutch to be engaged even more appropriately.

Preferably, the direct connection control unit is structured to make a pressure boost rate of change of the pressure boost engagement phase in the direct connection control command signal when the direct connection clutch is to be engaged in a condition in which the upshift operation of the shift speed is yet to be completed greater than a pressure boost rate of change in the condition in which the accelerator opening is constant or increasing.

With this structure, time required for an engagement pressure of the direct connection clutch to increase to a complete engagement pressure is shortened, so that a condition can be achieved at an early stage in which the torque transmitted from the output member is directly transmitted to the rotating electric machine via the direct connection clutch (negative torque outputted from the rotating electric machine is directly transmitted to the output member via the direct connection clutch). A condition of performing regeneration at a high efficiency can therefore be achieved at an even earlier stage.

Preferably, it is structured that the transmission includes a plurality of friction engagement elements for achieving each shift speed, the plurality of friction engagement elements being controlled to be engaged and disengaged according to an engagement side control command signal and a disengagement side control command signal, respectively; and the engagement side control command signal is a predetermined reference waveform defined by one or two or more variables, the reference waveform having a preliminary filling phase for filling an oil chamber on an engagement side of the friction engagement element with a hydraulic fluid and a pressure boost engagement phase for engaging the friction engagement element by boosting a hydraulic pressure of the hydraulic fluid. The control apparatus preferably further includes a learning control unit that corrects, based on setting values of the one, or two or more variables and an actual vehicle behavior when the shift speed is changed according to the setting values, the setting value of each of the variables of the subsequent engagement side control command signal when the state determination unit determines a change of the shift speed and the shift speed is changed.

With this structure, the setting values of one or two or more variables of the engagement side control command signal and the disengagement side control command signal are changed as necessary according to, for example, vehicle conditions and those friction engagement elements for achieving each shift speed in the transmission can be engaged or disengaged as appropriate. In addition, the learning control unit corrects, based on the setting values of the variables and an actual vehicle behavior when the shift speed is changed according to the setting values, the setting value of each of the variables of the subsequent engagement side control command signal. This allows the vehicle drive system to perform prompt and smooth shifting operations, while inhibiting reduction in the output torque, even with, for example, manufacturing variations and deterioration with time of the engine and the transmission.

Preferably, the learning control unit is structured to retain the setting value of each of the variables of the engagement side control command signal as they are, if the upshift operation of the shift speed and engagement of the direct connection clutch are performed in a condition in which the accelerator opening is decreasing.

In the aspect of the present invention, if the upshift operation of the shift speed and the engagement of the direct connection clutch are performed in the condition in which the accelerator opening is decreasing, the direct connection clutch is engaged regardless of the upshift operation of the shift speed, with top priority given to increasing the regeneration efficiency and with impact of some magnitude occurring through the shifting operation permitted from the beginning. Accordingly, with this structure, the learning control unit is structured not to correct the setting value of each of the variables of the engagement side control command signal in such a case. This helps prevent the setting value of each of the variables of the engagement side control command signal from being corrected to an inappropriate value.

Preferably, the variable is structured to include at least one or more of a filling pressure and a filling time in the preliminary filling phase of the engagement side control command signal and a target engagement pressure in the pressure boost engagement phase.

With this structure, either one or both of the filling pressure and the filling time in the preliminary filling phase are corrected as appropriate to thereby fill, in advance, the oil chamber of the engagement side friction engagement element with an adequate amount of hydraulic fluid. This inhibits the output torque during shifting from being reduced. The target engagement pressure in the pressure boost engagement phase is corrected as appropriate to thereby achieve an adequate magnitude of transmission torque capacity. This permits prompt and smooth shifting operations.

DETAILED DESCRIPTION OF EMBODIMENTS

Figure 1:
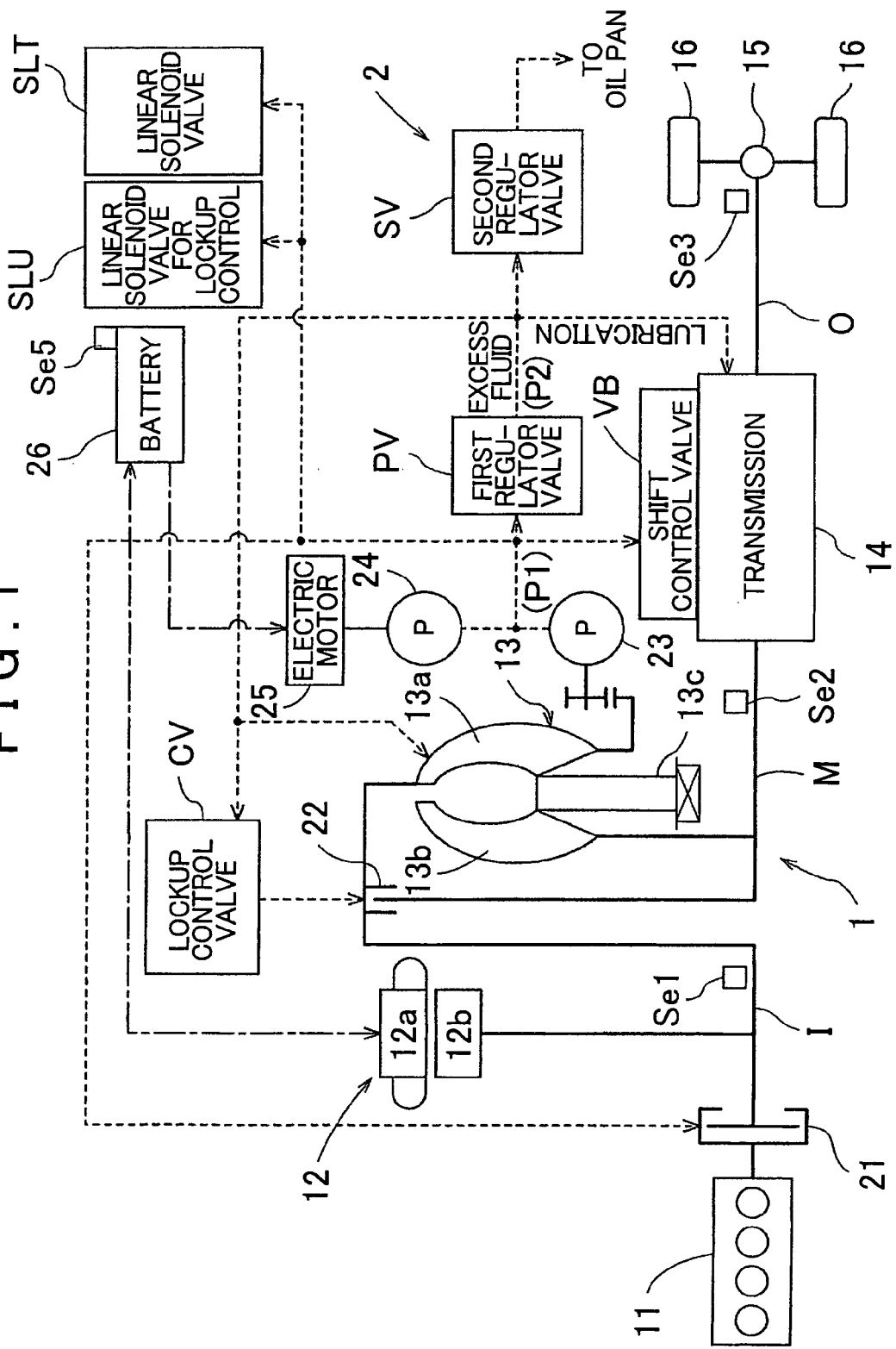
FIG. 1 is a schematic diagram showing a structure of a vehicle drive system including a control apparatus according to an embodiment of the present invention.
Figure 2:
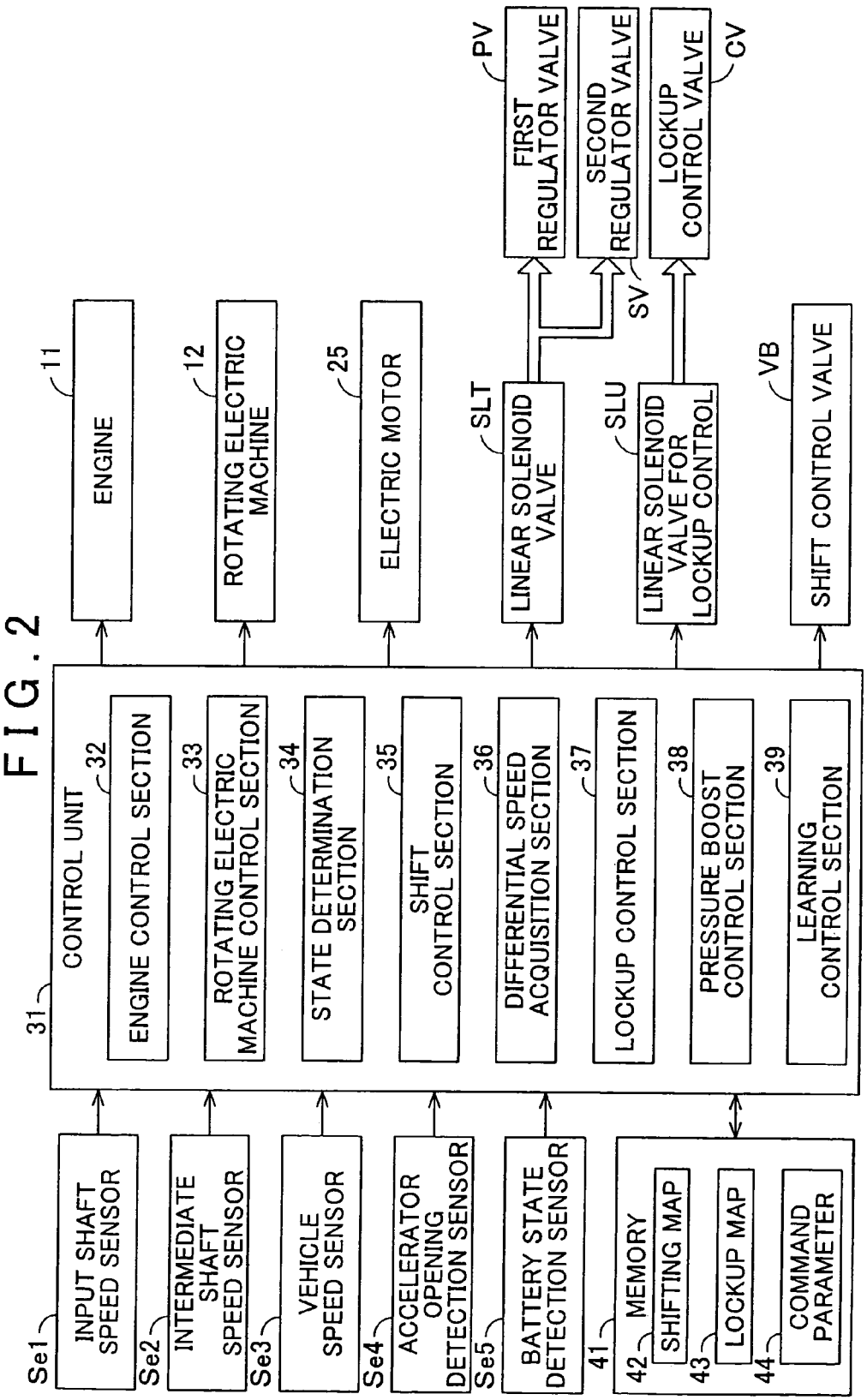
FIG. 2 is a block diagram showing a structure of a control unit according to the embodiment.

An embodiment of the present invention will be described below with reference to the drawings. The embodiment will be described using, as an example, a control apparatus according to the present invention applied to a vehicle drive system 1 for hybrid vehicles. FIG. 1 is a schematic diagram showing a structure of a drive transmission system and a hydraulic control system of the vehicle drive system 1 according to the embodiment. In FIG. 1, the solid line indicates a driving force transmission path, the broken line a hydraulic fluid supply path, and the dash-single-dot line an electric power supply path. Note that (P1) or (P2) placed adjacently to a broken line indicates that a hydraulic pressure of a hydraulic fluid in the corresponding supply path is a first hydraulic pressure P1 or a second hydraulic pressure P2. As shown in FIG. 1, the vehicle drive system 1 according to the present invention is generally structured to include an engine 11 and a rotating electric machine 12 as driving force sources, outputs driving force of these driving force sources via a torque converter 13 and a transmission 14, and transmits the driving force to a wheel 16. The vehicle drive system 1 also includes a hydraulic control unit 2 for supplying various parts such as the torque converter 13 and the transmission 14 with the hydraulic fluid. FIG. 2 is a block diagram showing a structure of a control unit 31 according to the embodiment. In FIG. 2, the solid line indicates a signal transmission path and the outlined arrow a signal pressure transmission path. As shown in FIG. 2, the control unit 31 according to the embodiment is structured to control various parts of the vehicle drive system 1 that includes the hydraulic control unit 2. The control unit 31 in this embodiment corresponds to the "control apparatus" in the present invention.

1. A structure of the Drive Transmission System of the Vehicle Drive System

The structure of the drive transmission system of the vehicle drive system 1 according to this embodiment will be described. Referring to FIG. 1, the vehicle drive system 1 includes the engine 11 and the rotating electric machine 12 as the driving force sources for driving a vehicle, the engine 11 and the rotating electric machine 12 being drivingly connected in series with each other to serve as a drive system for a parallel hybrid vehicle. The vehicle drive system 1 further includes the torque converter 13 and the transmission 14, so that rotatable driving force of the engine 11 and the rotating electric machine 12 as the driving force sources is transmitted to an output shaft O, while its speed is being changed by the torque converter 13 and the transmission 14.

The engine 11 is an internal combustion engine driven through combustion of fuel. An engine of a well-known type such as, for example, a gasoline engine and a diesel engine, can be used. In this example, an output rotation shaft such as a crankshaft of the engine 11 is drivingly connected to an input shaft I via a transfer clutch 21. This results in the input shaft I being selectively drivingly connected to the engine 11 via the transfer clutch 21. The transfer clutch 21 receives supply of the hydraulic fluid of the first hydraulic pressure P1 to be described later and is controlled to operate by a hydraulic control valve not shown. A structure may also be preferable, in which the output rotation shaft of the engine 11 is integrally drivingly connected, or drivingly connected via a damper or other member, to the input shaft I.

The rotating electric machine 12 includes a stator 12a and a rotor 12b. The stator 12a is fixed to a case not shown. The rotor 12b is rotatably supported on a radially inner side of the stator 12a. The rotor 12b of the rotating electric machine 12 is drivingly connected to the input shaft I so as to be integrally rotatable therewith. Specifically, in this embodiment, both the engine 11 and the rotating electric machine 12 are to be drivingly connected to the input shaft I. Therefore, the input shaft I in this embodiment corresponds to the "input member"

in the present invention. The rotating electric machine 12 is electrically connected to a battery 26 as an electricity storage device. The rotating electric machine 12 is able to perform functions as a motor that receives supply of electric power to generate driving force and as a generator that receives supply of the driving force to generate electric power. Specifically, the rotating electric machine 12 receives the supply of electric power from the battery 26 to perform power running, or stores electric power generated from the rotatable driving force transmitted from the wheel in the battery 26. Note that the battery 26 is only one example of the electricity storage device. A capacitor or other electricity storage units may be used instead, or an electricity storage unit of a plurality of types may be used in combination with each other.

In this vehicle drive system 1, the vehicle is run by transmitting the rotatable driving force of both the engine 11 and the rotating electric machine 12 to the wheel 16. At this time, the rotating electric machine 12 can be set into either one of the following two states depending on a charged state of the battery 26: specifically, in one, the rotating electric machine 12 generates the driving force using electric power supplied from the battery 26; and in the other, the rotating electric machine 12 generates electric power using the rotatable driving force of the engine 11. During deceleration of the vehicle, on the other hand, the transfer clutch 21 is disengaged and the engine 11 is set into a stationary state, so that the rotating electric machine 12 is in a state of generating electric power using the rotatable driving force transmitted from the wheel 16. The electric power generated by the rotating electric machine 12 is stored in the battery 26. When the vehicle remains stationary, the transfer clutch 21 is disengaged and the engine 11 and the rotating electric machine 12 are stationary.

The torque converter 13 is drivingly connected to the input shaft I. The torque converter 13 transmits the rotatable driving force of the input shaft I that is drivingly connected to the engine 11 and the rotating electric machine 12 as the driving force sources to the transmission 14 via an intermediate shaft M. The torque converter 13 includes a pump impeller 13a, a turbine runner 13b, and a stator 13c. Specifically, the pump impeller 13a serves as an input side rotary member drivingly connected to the input shaft I. The turbine runner 13b serves as an output side rotary member drivingly connected to the intermediate shaft M. The stator 13c disposed between these two parts includes a one-way clutch. The torque converter 13 transmits the driving force between the pump impeller 13a on a drive side and the turbine runner 13b on a driven side via the hydraulic fluid filled therein. The torque converter 13 in this embodiment corresponds to the "fluid coupling" in the present invention.

The torque converter 13 includes a lockup clutch 22 as a friction engagement element for lockup. The lockup clutch 22 serves as a clutch that connects the pump impeller 13a and the turbine runner 13b so that the two rotate integrally with each other in order to eliminate any difference in speed (slip) between the pump impeller 13a and the turbine runner 13b to increase transmission efficiency. When the lockup clutch 22 is in an engaged state, therefore, the torque converter 13 transmits the driving force of the driving force source (input shaft I) directly to the transmission 14 (intermediate shaft M) without involving the hydraulic fluid. The lockup clutch 22 in this embodiment corresponds to the "direct connection clutch" in the present invention. The torque converter 13 including the lockup clutch 22 is supplied with the hydraulic fluid of a second hydraulic pressure P2 to be described later.

The intermediate shaft M as an output shaft of the torque converter 13 is drivingly connected to the transmission 14. The transmission 14 transmits the rotatable driving force, while changing its speed, from the input shaft I transmitted via the torque converter 13 to the output shaft O on the side of the wheel 16. Note here that the transmission 14 is a stepped automatic transmission (stepped transmission) having a plurality of shift speeds. In this embodiment, the transmission 14 has three shift speeds (a first speed, a second speed, and a third speed) (not shown), each having a unique gear ratio. To establish the three shift speeds, the transmission 14 includes a gear mechanism, such as a planetary gear mechanism, and a plurality of friction engagement elements, such as a clutch or a brake, for selecting a shift speed by engaging or disengaging a rotary element of the gear mechanism. The transmission 14 changes the speed of the intermediate shaft M at a predetermined gear ratio set for each shift speed and converts torque for transmission to the output shaft O as an output member. The rotatable driving force transmitted from the transmission 14 to the output shaft O is then transmitted to the wheel 16 via a differential device 15. In this example, the input shaft I, the intermediate shaft M, and the output shaft O are coaxially disposed to form a single shaft structure.

2. A Structure of the Hydraulic Control Unit

The hydraulic control unit 2 that structures a hydraulic control system of the above-described vehicle drive system 1 will be described below. The hydraulic control unit 2 includes two types of pumps, a mechanical pump 23 and an electric pump 24, as shown in FIG. 1, and functions as a hydraulic source that draws in a hydraulic fluid stored in an oil pan not shown and supplies different parts of the vehicle drive system 1 with the hydraulic fluid. The mechanical pump 23 is operated by the rotatable driving force of the input shaft I (the engine 11 and the rotating electric machine 12 as the driving force sources). A gear pump or a vane pump, for example, is suitably used for the mechanical pump 23. In this example, the mechanical pump 23 is drivingly connected to the input shaft I via the pump impeller 13a of the torque converter 13 and driven by the rotatable driving force of either the engine 11 or the rotating electric machine 12, or both. The mechanical pump 23 basically has a sufficient discharge capacity more than the amount of hydraulic fluid required for the vehicle drive system 1. The mechanical pump 23 does not, however, discharge the hydraulic fluid while the input shaft I remains stationary (specifically, the vehicle remains stationary). In addition, though delivering the hydraulic fluid during low speed rotation of the input shaft I (specifically, while the vehicle runs at low speeds), the mechanical pump 23 may not be able to supply a required amount of fluid for the vehicle drive system 1. The vehicle drive system 1 therefore includes the electric pump 24 as an aid for the mechanical pump 23.

The electric pump 24 is operated by a driving force of a pump driving electric motor 25, regardless of the rotatable driving force of the input shaft I (driving force source). For example, a gear pump or a vane pump is again suitably used for the electric pump 24. The electric motor 25 that drives the electric pump 24 is electrically connected to the battery 26 and receives the supply of electric power from the battery 26 to generate a driving force. The electric pump 24 serves to assist the mechanical pump 23, and operates in a condition in which a required amount of fluid is not supplied from the mechanical pump 23, such as while the vehicle is stationary or running at low speeds. For its characteristic as an auxiliary pump, for reduction in its size and weight, and for reduction in power consumption of the electric motor 25, the electric pump 24 having a smaller discharging capacity than the mechanical pump 23 is used.

Further, the hydraulic control unit 2 includes a first regulator valve (primary regulator valve) PV and a second regulator valve (secondary regulator valve) SV as regulator valves for regulating the hydraulic pressure of the hydraulic fluid supplied form the mechanical pump 23 and the electric pump 24 to a predetermined pressure. The first regulator valve PV regulates the hydraulic pressure of the hydraulic fluid supplied from the mechanical pump 23 and the electric pump 24 to the first hydraulic pressure P1. The second regulator valve SV regulates the hydraulic pressure of an excess fluid from the first regulator valve PV to the second hydraulic pressure P2. Accordingly, the second hydraulic pressure P2 is set to a value lower than the first hydraulic pressure P1. The first hydraulic pressure P1 corresponds to a line pressure that serves as a reference hydraulic pressure of the vehicle drive system 1 and the value thereof is determined based on a signal pressure supplied from a linear solenoid valve SLT.

Referring to FIG. 2, a signal pressure from the common hydraulic pressure regulating linear solenoid valve SLT is supplied to the first regulator valve PV and the second regulator valve SV. Referring to FIG. 1, the first regulator valve PV regulates the hydraulic pressure of the hydraulic fluid upstream of the first regulator valve PV (on the side of the mechanical pump 23 and the electric pump 24) that is supplied from the mechanical pump 23 and the electric pump 24 and to the first hydraulic pressure P1 according to the signal pressure supplied thereto. The first regulator valve PV herein regulates the amount of the hydraulic fluid supplied from the mechanical pump 23 and the electric pump 24 to be discharged to the second regulator valve SV side based on a balance between the signal pressure supplied from the linear solenoid valve SLT and a feedback pressure of the first hydraulic pressure P1 regulated by the first regulator valve PV. Specifically, if the amount of the hydraulic fluid supplied from the mechanical pump 23 and the electric pump 24 is large, the first regulator valve PV increases the amount of the hydraulic fluid discharged to the second regulator valve SV side. If the amount of the hydraulic fluid supplied from the mechanical pump 23 and the electric pump 24 is small, on the other hand, the amount of the hydraulic fluid discharged to the second regulator valve SV side is reduced. The hydraulic pressure of the hydraulic fluid upstream of the first regulator valve PV is thereby regulated to the first hydraulic pressure P1 corresponding to the signal pressure.

The second regulator valve SV regulates the hydraulic pressure of the excess fluid discharged from the first regulator valve PV, specifically, the hydraulic pressure downstream (on the second regulator valve SV side) of the first regulator valve PV and upstream (on the first regulator valve PV side) of the second regulator valve SV to the predetermined second hydraulic pressure P2 according to the signal pressure supplied from the linear solenoid valve SLT. The second regulator valve SV herein regulates the amount of the excess hydraulic fluid discharged from the first regulator valve PV to be discharged (drained) to the oil pan based on a balance between the signal pressure supplied from the linear solenoid valve SLT and a feedback pressure of the second hydraulic pressure P2 regulated by the second regulator valve SV. Specifically, if the amount of the excess hydraulic fluid from the first regulator valve PV is large, the second regulator valve SV increases the amount of the hydraulic fluid discharged to the oil pan. If the amount of the excess hydraulic fluid from the first regulator valve PV is small, on the other hand, the amount of the hydraulic fluid discharged to the oil pan is reduced. The hydraulic pressure of the hydraulic fluid upstream of the second regulator valve SV is thereby regulated to the second hydraulic pressure P2 corresponding to the signal pressure.

The linear solenoid valve SLV receives the supply of the hydraulic fluid of the first hydraulic pressure P1 regulated by the first regulator valve PV as shown in FIG. 1, and the linear solenoid valve SLT outputs the hydraulic fluid of a signal pressure according to the SLT command value by adjusting a valve opening according to an SLT command value outputted from the control unit 31 as shown in FIG. 2. The signal pressure outputted from the linear solenoid valve SLT is, as a rule, a value proportional to the SLT command value. The hydraulic fluid of the signal pressure outputted from the linear solenoid valve SLT is supplied to the first regulator valve PV and the second regulator valve SV. Accordingly, the first regulator valve PV and the second regulator valve SV are each supplied with the signal pressure of the same value. The control unit 31 is structured to control the first regulator valve PV and the second regulator valve SV such that the first hydraulic pressure P1 and the second hydraulic pressure P2 are regulated according to the SLT command value outputted therefrom. The SLT command value that serves as a control signal of the linear solenoid valve SLT is determined in the control unit 31 based on vehicle information of various kinds including a running load and an accelerator opening and outputted to the linear solenoid valve SLT. The SLT command value outputted from the control unit 31 is, specifically, a current value that determines the opening of the linear solenoid valve SLT.

The hydraulic fluid of the first hydraulic pressure P1 regulated by the first regulator valve PV is supplied to the plurality of friction engagement elements of the transmission 14 via a shift control valve VB. The shift control valve VB controls an operation of engagement or disengagement of each of these friction engagement elements of the transmission 14. The shift control valve VB includes, for example, a plurality of control valves, each of these control valves corresponding to a corresponding one of the friction engagement elements. The shift control valve VB controls open/close operations of those control valves according to a control command value outputted from the control unit 31, thereby supplying the hydraulic fluid of the first hydraulic pressure P1 regulated by the first regulator valve PV to an oil chamber of the corresponding one of the friction engagement elements to control an operation of engagement or disengagement of each friction engagement element. The hydraulic fluid of the first hydraulic pressure P1 is supplied also to, for example, the transfer clutch 21. The hydraulic fluid of the second hydraulic pressure P2 regulated by the second regulator valve SV is supplied to, for example, a lubricant path of the transmission 14, the torque converter 13, and a lockup control valve CV for controlling the lockup clutch 22.

The lockup control valve CV controls an operation of engagement or disengagement of the lockup clutch 22. The lockup control valve CV is supplied with a signal pressure from a linear solenoid valve SLU for lockup control. The lockup control valve CV opens or closes according to the signal pressure supplied thereto to thereby supply an oil chamber of the lockup clutch 22 with the hydraulic fluid of the second hydraulic pressure P2 regulated by the second regulator valve SV. Like the hydraulic pressure regulating linear solenoid valve SLT, the lockup control linear solenoid valve SLU regulates, while receiving the supply of the hydraulic fluid of the first hydraulic pressure P1 regulated by the first regulator valve PV, valve opening according to a control command signal outputted from the control unit 31 to thereby output the hydraulic fluid of a signal pressure according to the control command signal.

3. A Structure of the Control Unit

The structure of the control unit 31 according to the embodiment will be described below. The control unit 31 included in the vehicle drive system 1 functions as a core member performing operation control of parts of the vehicle drive system 1 as shown in FIG. 2. The control unit 31 includes, in addition to a CPU or other arithmetic operation unit as a core member, RAM (random access memory) structured to be able to read data from, and write data to, the arithmetic operation unit, ROM (read only memory) structured to be able to read data from the arithmetic operation unit, and other storage device (not shown). Software (programs) stored in, for example, the ROM or separate hardware, such as an operation circuit, or both structure functional sections 32 to 39 of the control unit 31. Each of these functional sections 32 to 39 is structured to transfer information between each other. A memory 41 includes a storage medium as hardware structure capable of storing and rewriting information, such as a flash memory, to permit transfer of information with the control unit 31. The memory 41 may be disposed inside the storage device included in the control unit 31.

Referring to FIGS. 1 and 2, the vehicle drive system 1 includes a plurality of sensors disposed at parts thereof The sensors specifically include an input shaft speed sensor Se1, an intermediate shaft speed sensor Se2, a vehicle speed sensor Se3, an accelerator opening detection sensor Se4, and a battery state detection sensor Se5. The input shaft speed sensor Se1 detects a rotating speed of the input shaft I. In this embodiment, the input shaft I is drivingly connected to the pump impeller 13a of the torque converter 13. Accordingly, the speed detected by the input shaft speed sensor Se1 is the speed of the torque converter 13 on the input side. The intermediate shaft speed sensor Se2 detects a rotating speed of the intermediate shaft M. In this embodiment, the intermediate shaft M is drivingly connected to the turbine runner 13b of the torque converter 13. Accordingly, the speed detected by the intermediate shaft speed sensor Se2 is the speed of the torque converter 13 on the output side. The vehicle speed sensor Se3 detects a rotating speed of the wheel 16, specifically, the vehicle speed. The accelerator opening detection sensor Se4 detects an accelerator opening by detecting the amount of operation of an accelerator pedal not shown. The battery state detection sensor Se5 detects a battery state, for example, the amount of charge and a voltage value of the battery 26. Information indicating detection result of each of these sensors Se1 to Se5 is outputted to the control unit 31.

Referring to FIG. 2, the control unit 31 includes an engine control section 32, a rotating electric machine control section 33, a state determination section 34, a shift control section 35, a differential speed acquisition section 36, a lockup control section 37, a pressure boost control section 38, and a learning control section 39. The memory 41 to which each of the functional sections 32 to 39 of the control unit 31 refers stores therein a shifting map 42, a lockup map 43, and a command parameter 44. Each of the functional sections 32 to 39 of the control unit 31 will be described in detail below.

The engine control section 32 is a functional section that performs operation control of the engine 11. The engine control section 32 determines an engine operating point and controls the engine 11 to be operable at the engine operating point. The engine operating point refers to a control command value that represents a control target point of the engine 11 and is determined according to the speed and torque. More specifically, the engine operating point is a command value that represents the control target point of the engine 11 determined in consideration of a vehicle output requirement (determined based on a vehicle torque requirement and an engine speed) and an optimum fuel economy. The engine operating point is determined according to a speed command value and a torque command value. The engine control section 32 controls the engine 11 so as to be operable at the torque and the speed specified for the engine operating point.

The rotating electric machine control section 33 is a functional section that performs operation control of the rotating electric machine 12. The rotating electric machine control section 33 determines a rotating electric machine operating point and controls the rotating electric machine 12 to be operable at the rotating electric machine operating point. The rotating electric machine operating point refers to a control command value representing a control target point of the rotating electric machine 12 and is determined according to the speed and torque. More specifically, the rotating electric machine operating point is a command value representing the control target point of the rotating electric machine 12 determined in consideration of the vehicle output requirement and the engine operating point and is determined according to a speed command value and a torque command value. The rotating electric machine control section 33 controls the rotating electric machine 12 so as to be operable at the torque and the speed specified for the rotating electric machine operating point. In addition, the rotating electric machine control section 33 controls to switch between a state in which the rotating electric machine 12 produces, according to the amount of charge in the battery 26 detected by the battery state detection sensor Se5, a driving force by using electric power supplied from the battery 26 and a state in which the rotating electric machine 12 generates electric power by using the rotatable driving force of the engine 11.

In accordance with the embodiment, the rotating electric machine control section 33 is arranged to be able to reduce a difference in speed between the pump impeller 13a that serves as the input side rotary element of the torque converter 13 and the turbine runner 13b that serves as the output side rotary member of the torque converter 13 by controlling the output torque and the speed of the rotating electric machine 12, when the lockup control section 37 to be described later is to control the lockup control valve CV to engage the lockup clutch 22. Specifically, the rotating electric machine control section 33 controls the output torque and the speed of the rotating electric machine 12. The rotating electric machine control section 33 thereby increases or decreases the speed of the input shaft I and the pump impeller 13a that are drivingly connected to the rotor 12b, so that the speed of the pump impeller 13a can be controlled to be closer to the speed of the turbine runner 13b. Additionally, the rotating electric machine control section 33 is arranged to control also the speed of the electric motor 25 for driving the electric pump 24.

Figure 3:
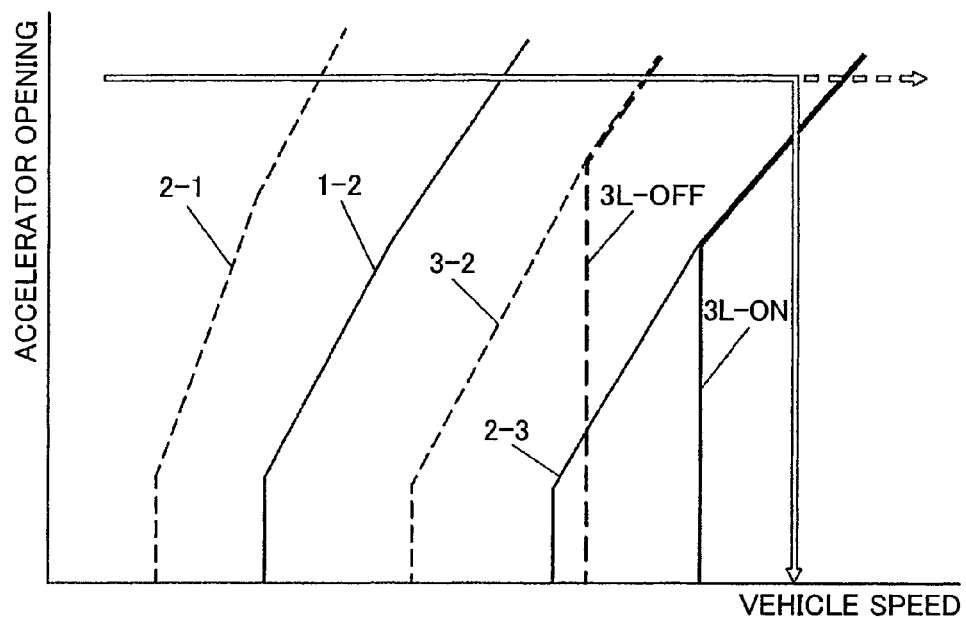
FIG. 3 is a diagram showing an example of a shifting map according to the embodiment.

The state determination section 34 is a functional section that determines the shift speed in the transmission 14 and an operating state of the lockup clutch 22 based on the accelerator opening and vehicle speed of the vehicle. The state determination section 34 in this embodiment corresponds to "state determination unit" of the present invention. To determine the shift speed and the operating state of the lockup clutch 22, the state determination section 34 refers to the shifting map 42 and the lockup map 43 stored in the memory 41. FIG. 3 is a diagram showing an example of the shifting map 42 and the lockup map 43 according to the embodiment. The shifting map 42 and the lockup map 43 herein overlap to form a single map (the overlapping map may hereinafter be referred to as the "shifting map 42"). These maps may individually be stored. The shifting map 42 sets up a transition schedule of shift speeds in the transmission 14 based on the accelerator opening and the vehicle speed. Referring to FIG. 3, a plurality of upshift lines and a plurality of downshift lines, each of these lines being represented by a substantially rightwardly upward straight line (being represented that the accelerator opening becomes greater as the vehicle speed increases), are set. The upshift line defines a transition schedule from a low shift speed to a high shift speed in two adjacent shift speeds in the transmission 14. The downshift line defines a transition schedule from a high shift speed to a low shift speed. The transmission 14 has three shift speeds in this embodiment. An upshift line from the first speed to the second speed, an upshift line from the second speed to the third speed, a downshift line from the second speed to the first speed, and a downshift line from the third speed to the second speed are therefore set, respectively. Note here that an upshift means a shift to a shift speed having a smaller gear ratio (speed reducing ratio) and a downshift means a shift to a shift speed having a greater gear ratio (speed reducing ratio).

The lockup map 43 sets up a lockup schedule of the lockup clutch 22 based on the accelerator opening and the vehicle speed. As shown in FIG. 3, an ON lock line and an OFF lock line are set, each being represented by a combination of a straight line that extends substantially in parallel with the ordinate (a constant vehicle speed) and a rightwardly upward straight line. The ON lock line defines a transition schedule from a disengaged state to an engaged state of the lockup clutch 22, while the OFF lock line defines a transition schedule from the engaged state to the disengaged state of the lockup clutch 22. In this embodiment, the lockup clutch 22 is arranged to be maintained in the disengaged state when the shift speed is the first speed or the second speed and therefore only the ON lock line and the OFF lock line when the shift speed is the third speed are set.

The shift control section 35 is a functional section that controls to select the shift speed of the transmission 14 by controlling the operation of the shift control valve VB in accordance with the shift speed determined by the state determination section 34. To perform such a control, the control unit 31 is connected with the linear solenoid valve SLT. The shift control section 35 then outputs an SLT command signal as a control signal to the linear solenoid valve SLT. The first regulator valve PV and the second regulator valve SV are controlled by this SLT command signal, which results in the first hydraulic pressure P1 and the second hydraulic pressure P2 being regulated. A plurality of control valves is operated according to a control command value as a control signal outputted from the shift control section 35 to the shift control valve VB, while the hydraulic fluid regulated to the first hydraulic pressure P1 is supplied to the shift control valve VB, so that each of the friction engagement elements of the transmission 14 is controlled to be engaged or disengaged.

Figure 4:
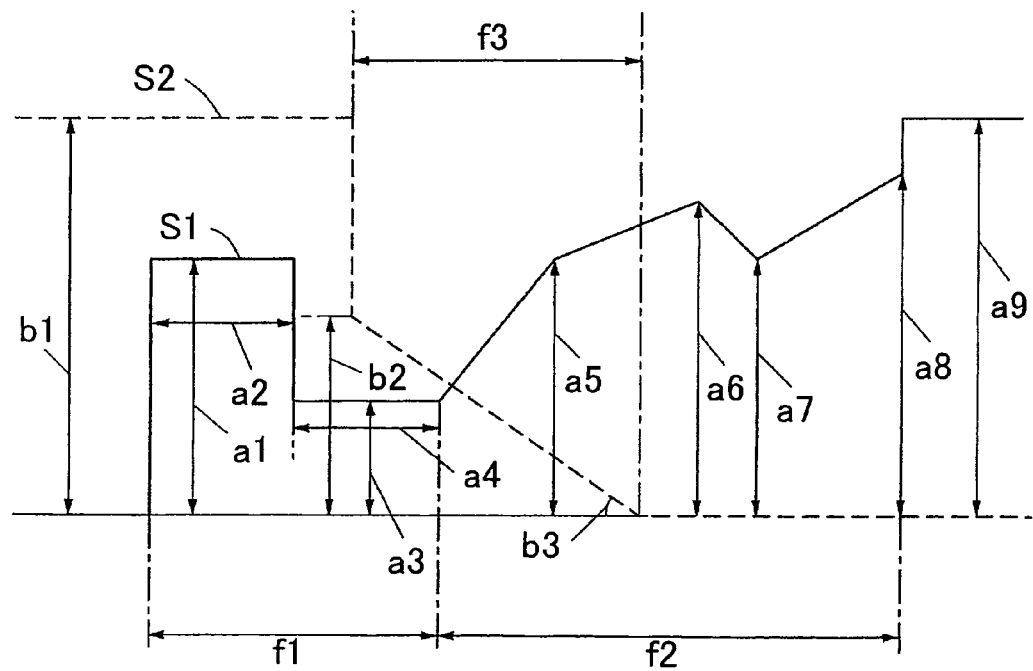
FIG. 4 is a schematic diagram showing an engagement side control command signal and a disengagement side control command signal according to the embodiment.

The control signal outputted from the shift control section 35 to the shift control valve VB includes an engagement side control command signal S1 and a disengagement side control command signal S2. Specifically, the engagement side control command signal S1 is concerned with the friction engagement element to be engaged and the disengagement side control command signal S2 is concerned with the friction engagement element to be disengaged. Referring to FIG. 4, the engagement side control command signal S1 includes a preliminary filling phase f1 and a pressure boost engagement phase f2. Specifically, the preliminary filling phase f1 is for filling the oil chamber of the friction engagement element to be engaged with the hydraulic fluid and the pressure boost engagement phase f2 is for boosting an engagement pressure of the friction engagement element to be engaged by boosting the hydraulic pressure of the hydraulic fluid filled in the oil chamber. The engagement side control command signal S1 is generated by a predetermined reference waveform's being defined by one, or two or more command parameters 44. The command parameter 44 in this embodiment corresponds to the "variable" in the present invention. In accordance with this embodiment, a filling pressure a1, a filling time a2, a retention pressure a3, and a retention time a4 in the preliminary filling phase f1 and target engagement pressures a5 to a8 and a complete engagement pressure a9 in the pressure boost engagement phase f2 are set, respectively, as such command parameters 44 in the engagement side control command signal S1. This results in the engagement side control command signal S1 being generated of a waveform corresponding to a setting value of each of the command parameters (a1 to a9), while being based on the predetermined reference waveform.

The disengagement side control command signal S2 includes a pressure reduction disengagement phase f3 that reduces the hydraulic pressure of the hydraulic fluid filled in the oil chamber to thereby reduce the engagement pressure of the friction engagement element to be disengaged. The disengagement side control command signal S2 is generated by a predetermined reference waveform's being defined by one, or two or more command parameters 44. In accordance with this embodiment, a complete engagement pressure b1, a pressure reduction starting pressure b2, and a pressure reduction rate of change b3 in the pressure reduction disengagement phase f3 are set, respectively, as such command parameters 44 in the disengagement side control command signal S2. This results in the disengagement side control command signal S2 being generated of a waveform corresponding to a setting value of each of the command parameters (b1 to b3), while being based on the predetermined reference waveform. The generated engagement side control command signal S1 and disengagement side control command signal S2 are outputted to the shift control valve VB and the engagement pressure of each friction engagement element is controlled. The engagement pressure of the friction engagement element on the engagement side increases to a predetermined value or more and the engagement pressure of the friction engagement element on the disengagement side decreases to a predetermined value or more, which achieves a so-called engaging/disengaging shift. In this embodiment, a shifting operation (an upshift operation or a downshift operation) is to be completed when the engagement pressure of the friction engagement element on the engagement side becomes the complete engagement pressure a9 in accordance with the engagement side control command signal S1.

The differential speed acquisition section 36 is a functional section that acquires a differential speed rN that represents a difference in speed between the input side drivingly connected to the input shaft I of the torque converter 13 and the output side drivingly connected to the transmission. The differential speed acquisition section 36 in this embodiment corresponds to the "differential speed acquisition unit" in the present invention. The differential speed acquisition section 36 uses as a basis the speed of the pump impeller 13a drivingly connected to the input shaft I, detected by the input shaft speed sensor Se1 and the speed of the turbine runner 13b drivingly connected to the intermediate shaft M, detected by the intermediate shaft speed sensor Se2 to calculate the difference between these, thereby acquiring the differential speed rN. The differential speed rN is acquired as an absolute value of the difference between these. The information on the acquired differential speed rN is outputted to the rotating electric machine control section 33, the lockup control section 37, and the pressure boost control section 38.

The lockup control section 37 is a functional section that controls the operating state of the lockup clutch 22 according to the operating state determined by the state determination section 34. The lockup clutch 22 can take any one of the following states as its operating state: a "disengaged state", a "half-engaged state", and a "completely engaged state". The "disengaged state" represents a state in which the lockup clutch 22 is not engaged at all. In the disengaged state, rotation of the input shaft I is transmitted to the intermediate shaft M via the torque converter 13. The "completely engaged state" represents a state in which the lockup clutch 22 is engaged completely. In the completely engaged state, the input shaft I and the intermediate shaft M rotate integrally with each other involving zero differential speed rN. The "half-engaged state" represents a state between the disengaged state and the completely engaged state, in which the lockup clutch 22 is incompletely engaged. In the half-engaged state, the input shaft I and the intermediate shaft M rotate integrally with each other, while slipping involving a predetermined differential speed rN therebetween.

The lockup control section 37 controls the operation of the lockup control valve CV, thereby controlling to change the operating state of the lockup clutch 22 as selected from among the "disengaged state", the "half-engaged state", and the "completely engaged state". To perform the foregoing controls, the control unit 31 is connected with the linear solenoid valve SLU for lockup control. The lockup control section 37 outputs a lockup control command signal S3 to the linear solenoid valve SLU for lockup control. The linear solenoid valve SLU supplies a signal pressure for controlling the lockup control valve CV according to the lockup control command signal S3. The lockup control valve CV is controlled according to the signal pressure, so that the lockup clutch 22 is controlled to be engaged or disengaged.

Figure 5:
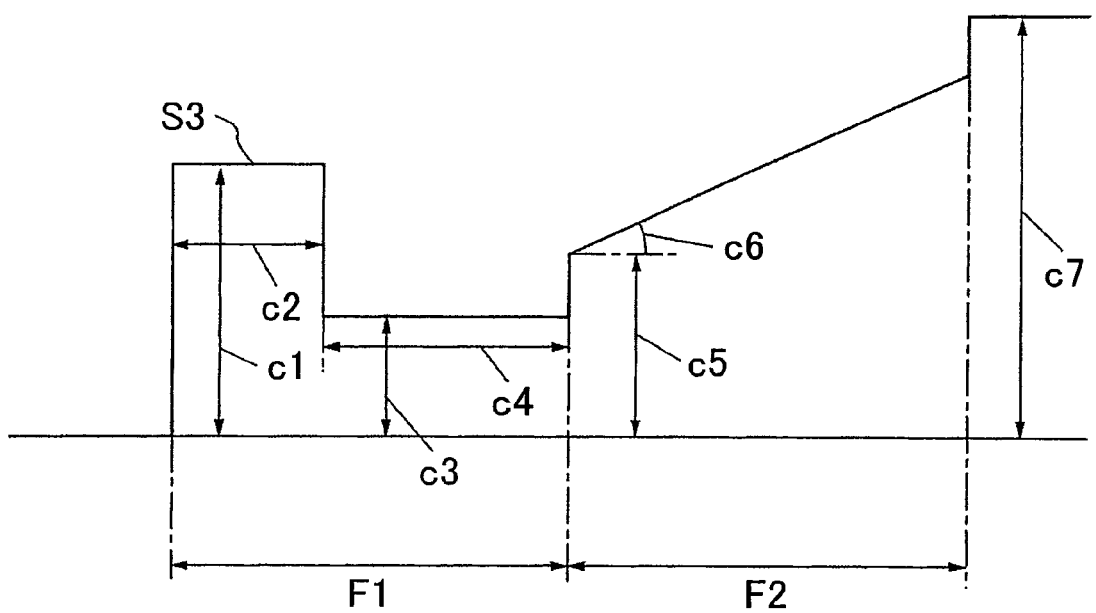
FIG. 5 is a schematic diagram showing a lockup control command signal according to the embodiment.

Referring to FIG. 5, the lockup control command signal S3 includes a preliminary filling phase F1 and a pressure boost engagement phase F2. Specifically, the preliminary filling phase F1 is for filling the oil chamber on the engagement side of the lockup clutch 22 with the hydraulic fluid and the pressure boost engagement phase F2 is for boosting the hydraulic pressure of the hydraulic fluid filled in the oil chamber on the engagement side to thereby engage the lockup clutch 22. The lockup control command signal S3 is generated by a predetermined reference waveform's being defined by one, or two or more command parameters 44. The command parameter 44 in this embodiment corresponds to the "variable" in the present invention. In accordance with this embodiment, a filling pressure c1, a filling time c2, a retention pressure c3, and a retention time c4 in the preliminary filling phase F1 and a pressure boost starting pressure c5, a pressure boost rate of change (a normal pressure boost rate of change to be described later) c6, a rapid pressure boost rate of change c6', and a complete engagement pressure c7 in the pressure boost engagement phase F2 are set, respectively, as such command parameters 44 in the lockup control command signal S3. This results in the lockup control command signal S3 being generated of a waveform corresponding to a setting value of each of the command parameters (c1 to c7), while being based on the predetermined reference waveform. The generated lockup control command signal S3 is outputted to the linear solenoid valve SLU for lockup control as described earlier and the linear solenoid valve SLU translates the signal to a corresponding signal pressure for controlling the lockup control valve CV. The "direct connection control command signal" in the present invention therefore includes the signal pressure representing a hydraulic pressure signal translated from the lockup control command signal S3, in addition to the lockup control command signal S3 in this embodiment.

The operating state of the lockup clutch 22 controlled by the lockup control command signal S3 and the signal pressure corresponding thereto (hereinafter may be referred to simply as the "lockup control command signal S3") will be described below. In the preliminary filling phase F1 of the lockup control command signal S3, the hydraulic fluid controlled to the filling pressure c1 is supplied to the oil chamber on the engagement side of the lockup clutch 22 for the filling time c2 only. The hydraulic fluid is thereafter maintained at the retention pressure c3 for the retention time c4 only. In this condition, the lockup clutch 22 is not engaged at all, and is in the "disengaged state". The hydraulic fluid maintained at the retention pressure c3 is, however, filled in the oil chamber on the engagement side of the lockup clutch 22, so that the lockup clutch 22 can be engaged quickly, if the hydraulic pressure of the hydraulic fluid is boosted by a predetermined magnitude. Consequently, the "preliminary operation" in the present invention is performed by the control of the lockup clutch 22 in accordance with the preliminary filling phase F1 of the lockup control command signal S3.

In the pressure boost engagement phase F2 of the lockup control command signal S3, the hydraulic fluid is boosted to the pressure boost starting pressure c5 and then gradually boosted at the pressure boost rate of change c6. In an early stage of pressure boost at this time, the lockup clutch 22 is not completely engaged, and is in the "half-engaged state". In this half-engaged state, the differential speed rN acquired by the differential speed acquisition section 36 has a predetermined value. As the hydraulic pressure (engagement pressure) of the hydraulic fluid gradually increases, the differential speed rN gradually decreases to a small value. When the differential speed rN then becomes zero, the lockup clutch 22 is completely engaged to be in the "completely engaged state". Accordingly, the engagement pressure of the lockup clutch 22 is boosted according to the pressure boost engagement phase F2 of the lockup control command signal S3 to thereby decrease the differential speed rN, so that the lockup clutch 22 is shifted from the disengaged state to the engaged state. This results in the "engagement operation" in the present invention being performed. The hydraulic pressure of the hydraulic fluid is thereafter increased to the complete engagement pressure c7, so that a condition develops in which the "completely engaged state" is reliably maintained.

An upshift of the shift speed and engagement of the lockup clutch may be substantially-simultaneously requested while the vehicle is running. For example, as indicated by the outlined arrow or the outlined dashed arrow on the shifting map 42 of FIG. 3, if the upshift line from the second speed to the third speed and the ON lock line when the shift speed is the third speed are crossed substantially simultaneously, the state determination section 34 determines the upshift of the transmission 14 from the second speed to the third speed and the transition of the lockup clutch 22 from the disengaged state to the engaged state based on the shifting map 42. Note that the outlined arrow represents a situation in which the above-described decision is made in a condition of the accelerator opening decreasing and the outlined dashed arrow represents a situation in which the above-described decision is made in a constant condition, while the accelerator opening has a predetermined magnitude. Under these circumstances, the lockup control section 37 is arranged to perform a first control operation relating to the upshift operation of the shift speed and the engagement operation of the lockup clutch 22 and, depending on conditions, further perform a second control operation. Specific details of the first control operation and the second control operation will be described below.

In the first control operation, control is performed to adjust timing at which each of the upshift operation of the shift speed and the engagement operation of the lockup clutch 22 is executed. The timing of these operations is adjusted according to, for example, changes in the accelerator opening and the differential speed rN between the input shaft I and the intermediate shaft M. First, if the state determination section 34 determines the upshift of the shift speed and the transition of the lockup clutch 22 from the disengaged state to the engaged state in a condition in which the accelerator opening detected by the accelerator opening detection sensor Se4 is constant or increasing, the lockup control section 37 engages the lockup clutch 22 after the upshift operation of the shift speed is completed. If the accelerator opening is constant at zero, however, control in a condition of the accelerator opening decreasing as will be described later is exceptionally performed.

Figure 6:
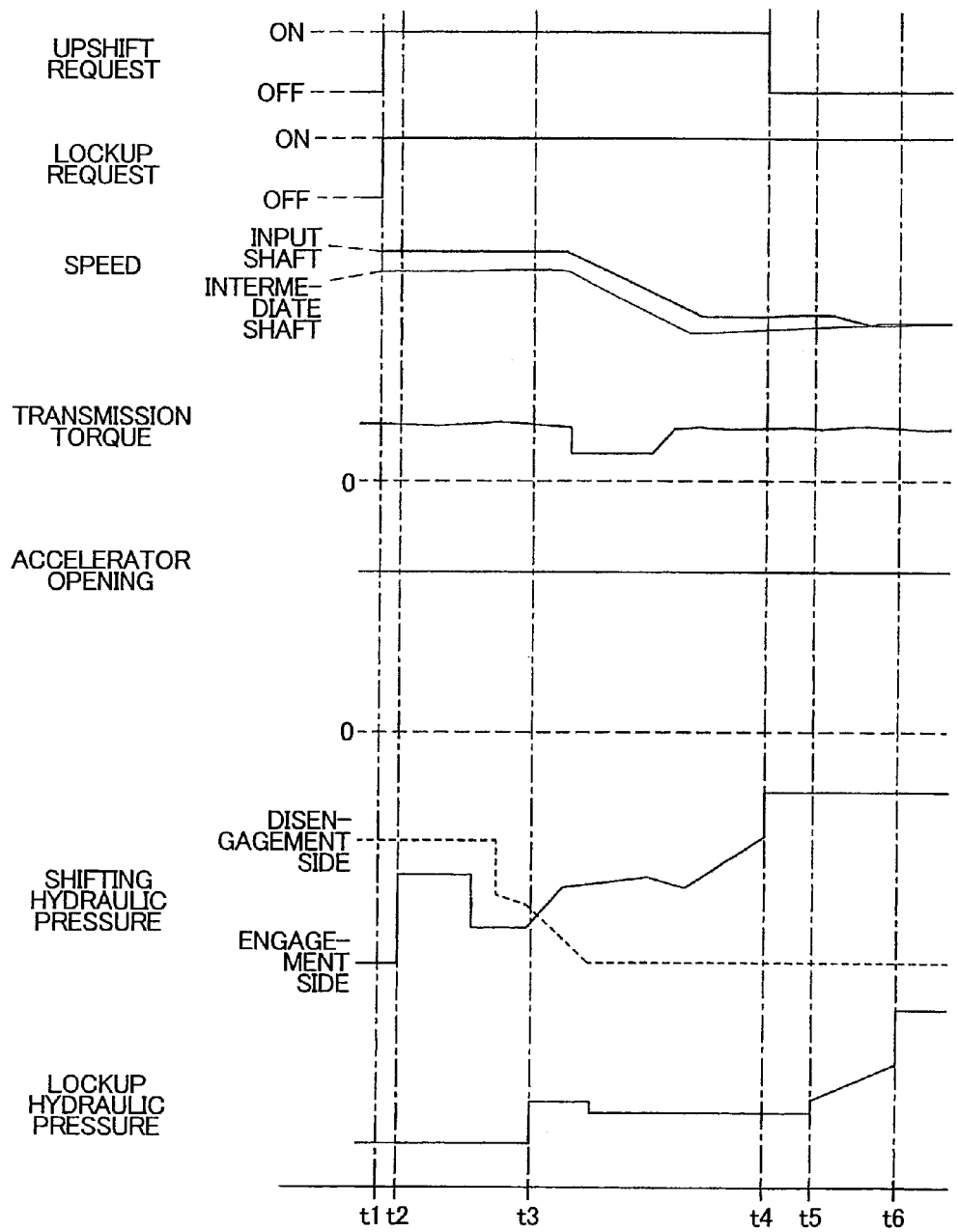
FIG. 6 is a timing chart for illustrating a first control operation (with an accelerator ON) according to the embodiment.

FIG. 6 is a timing chart for illustrating the first control operation in the condition in which the accelerator opening is constant or increasing. Shown in FIG. 6 are, in sequence from top downward, an upshift request, a lockup request, the speed of the input shaft I and the intermediate shaft M, the transmission torque (torque transmitted to the input side of the transmission 14), the accelerator opening, the engagement pressure controlled by the engagement side control command signal S1 and the engagement pressure controlled by the disengagement side control command signal S2, and the hydraulic pressure controlled by the lockup control command signal S3. When the state determination section 34 determines the upshift of the shift speed and the transition of the lockup clutch 22 from the disengaged state to the engaged state to thereby turn ON the upshift request and the lockup request at time t1, preliminary filling of the engagement side friction engagement element with the hydraulic fluid begins at time t2, so that the shifting operation is started. Thereafters at time t3 during the shifting operation, preliminary filling of the lockup clutch 22 with the hydraulic fluid is started. The shifting operation is completed when, at time t4, the engagement pressure of the engagement side friction engagement element with the hydraulic fluid becomes the complete engagement pressure. As the shifting operation is completed, the upshift request is turned OFF. Starting at time t5 thereafter, the hydraulic pressure of the hydraulic fluid relative to the lockup clutch 22 is gradually boosted. Going though the disengaged state and the half-engaged state, the hydraulic pressure of the hydraulic fluid is increased to the complete engagement pressure at time t6. This completes the transition to the completely engaged state.

The lockup clutch 22 is engaged after the shifting operation (the upshift operation of the shift speed in this case) as described above, which causes the rotation of the intermediate shaft M and variations in the transmission torque involved in the shifting operation to be transmitted to the input shaft I via the torque converter 13. This inhibits impact on the vehicle caused by the shifting (shift shock).

If the state determination section 34 determines the upshift of the shift speed and the transition of the lockup clutch 22 from the disengaged state to the engaged state in the condition in which the accelerator opening detected by the accelerator opening detection sensor Se4 is decreasing or the accelerator opening is constant at zero, the lockup control section 37 engages the lockup clutch 22 regardless of the upshift operation of the shift speed, on condition that the differential speed rN is equal to or less than an engagement permitting threshold value C1. Specifically, unlike the control performed in the condition in which the accelerator opening is constant or increasing described above, the lockup clutch 22 is engaged regardless of the completion of the shifting operation (the upshift operation of the shift speed in this case). In this embodiment, the lockup control section 37 engages the lockup clutch 22 before the upshift operation of the shift speed is completed. More specifically, substantially at the same time that the state determination section 34 determines the transition of the lockup clutch 22 from the disengaged state to the engaged state, the lockup control section 37 outputs the lockup control command signal S3 to let the preliminary operation performed immediately, and boosts the hydraulic pressure of the hydraulic fluid to engage the lockup clutch 22 before the upshift operation of the shift speed is completed.

The engagement permitting threshold value C1 that defines one of criteria for the condition for the lockup control section 37's engaging the lockup clutch 22 regardless of the upshift operation of the shift speed is set to a value of the differential speed rN that results in an impact when the lockup clutch 22 is engaged that is smaller than the impact on the vehicle generated by decreasing the accelerator opening. Specifically, the engagement permitting threshold value C1 is set to a value of the differential speed rN that results in the impact generated when the lockup clutch 22 is engaged is smaller than the impact generated when the accelerator opening is decreased.

Figure 7:
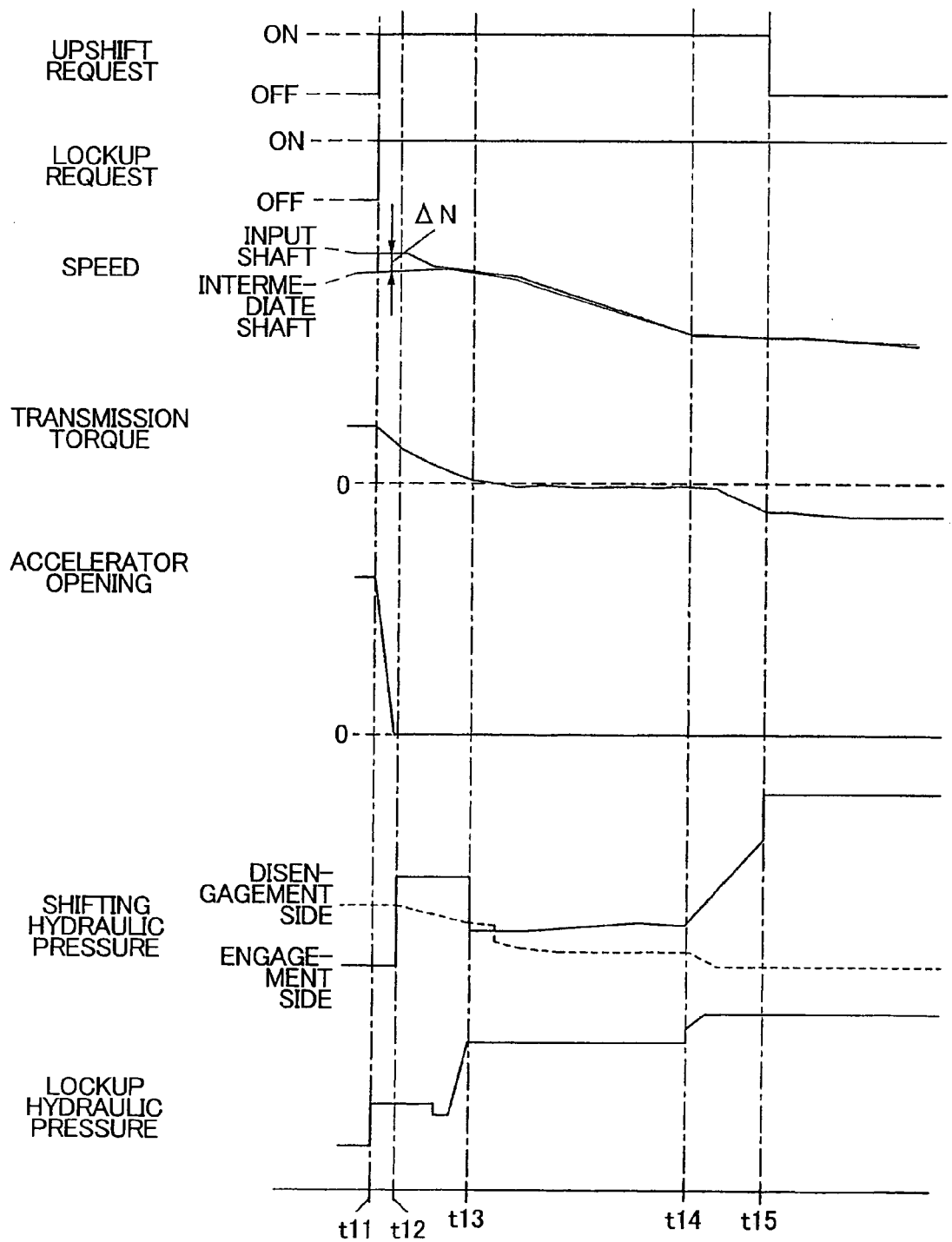
FIG. 7 is a timing chart for illustrating the first control operation (with the accelerator OFF) according to the embodiment.

FIG. 7 is a timing chart for illustrating the first control operation in the condition in which the accelerator opening is decreasing (here, the accelerator opening changes to a fully closed position). Shown in FIG. 7 are, as in FIG. 6, in sequence from top to bottom, the upshift request, the lockup request, the speed of the input shaft I and the intermediate shaft M, the transmission torque (torque transmitted to the input side of the transmission 14), the accelerator opening, the engagement pressure controlled by the engagement side control command signal S1 and the engagement pressure controlled by the disengagement side control command signal S2, and the hydraulic pressure controlled by the lockup control command signal S3. The differential speed rN is equal to or less than the engagement permitting threshold value C1. At the same time that the state determination section 34 determines the upshift of the shift speed and the transition of the lockup clutch 22 from the disengaged state to the engaged state to thereby turn ON the upshift request and the lockup request at time t11, preliminary filling of the lockup clutch 22 with the hydraulic fluid is started. Preliminary filling of the engagement side friction engagement element with the hydraulic fluid is started at time t12, so that the shifting operation is started. Thereafter at time t13, at which timing the preliminary filling of the engagement side friction engagement element with the hydraulic fluid is still underway and the upshift operation of the shift speed is yet to be completed, the hydraulic pressure of the hydraulic fluid relative to the lockup clutch 22 is boosted at once to establish the completely engaged state. Further at time t14, the hydraulic pressure of the hydraulic fluid is increased to the complete engagement pressure. The shifting operation is completed when, at time t15, the engagement pressure of the hydraulic fluid relative to the engagement side friction engagement element becomes the complete engagement pressure. The upshift request is turned off as the shifting operation is completed.

In the condition in which the accelerator opening is decreasing (specifically, the accelerator opening changes to the fully closed position) when the state determination section 34 determines the upshift of the shift speed and the transition of the lockup clutch 22 from the disengaged state to the engaged state, the driver may thereafter perform a braking operation or operate otherwise to brake the vehicle. In such cases, a regenerative operation is to be performed as the vehicle is decelerated. Assume, for example, that the control is performed in the condition in which the accelerator opening is constant or increasing as described earlier. Then, it requires a given period of time before the lockup clutch 22 becomes the completely engaged state. Then, torque transmitted from the wheel 16 is transmitted to the rotating electric machine 12 via the torque converter 13, resulting in reduced regeneration efficiency. In contrast, in this embodiment, the lockup control section 37 engages the lockup clutch 22, in such cases, before the shifting operation is completed. This achieves at an early stage a condition in which the torque transmitted from the wheel 16 is directly transmitted to the rotating electric machine 12 via the lockup clutch 22. A condition of performing regeneration at a high efficiency can therefore be achieved at an early stage. FIG. 7 shows that the transmission torque is negative before time t15 at which the upshift operation of the shift speed is completed to thereby allow the rotating electric machine 12 to perform regeneration.

At this time, the lockup control section 37 engages the lockup clutch 22 only when the differential speed rN is equal to or less than the engagement permitting threshold value C1. Even if the lockup clutch 22 is engaged regardless of the completion of the shifting operation, the impact on the vehicle generated as a result of the engagement operation of the lockup clutch 22 can be indistinguished from the impact on the vehicle generated by decreasing the accelerator opening.

In the first control operation described above, the lockup clutch 22 is engaged at an early stage by engaging the lockup clutch 22 regardless of the upshift operation of the shift speed in the condition in which the accelerator opening detected by the accelerator opening detection sensor Se4 is decreasing. This operation is, however, implemented on condition that the differential speed rN is equal to or less than the engagement permitting threshold value C1. A situation can therefore occur in which such a control cannot be performed. For example, if the speed of the input shaft I is reduced largely than the speed of the intermediate shaft M as the accelerator opening is fully closed and the differential speed rN becomes equal to or more than the engagement permitting threshold value C1, the lockup control section 37 is unable to engage the lockup clutch 22 regardless of the upshift operation of the shift speed even if the state determination section 34 determines the upshift of the shift speed and the transition of the lockup clutch 22 from the disengaged state to the engaged state in the condition in which the accelerator opening is decreasing. Accordingly, similarly as in the first control operation in the condition in which the accelerator opening is constant or increasing, if the engagement pressure of the lockup clutch 22 is boosted after the upshift operation of the shift speed is completed when the differential speed rN is equal to or more than the engagement permitting threshold value C1, the lockup clutch 22 can no longer be engaged at an early stage.

In this embodiment, therefore, the second control operation is performed, with respect to the engagement operation of the lockup clutch 22, for promptly shifting from the disengaged state to the completely engaged state, if the accelerator opening is decreasing and the differential speed rN is equal to or more than the engagement permitting threshold value C1. To perform such a control, in the second control operation, the engagement pressure of the lockup clutch 22 as controlled by the lockup control section 37 is changed to the rapid pressure boost rate of change c6' that is greater than the pressure boost rate of change (this is referred to as the normal pressure boost rate of change) c6 in the condition in which the accelerator opening is constant or increasing, when the differential speed rN becomes equal to or less than a predetermined pressure boost permitting threshold value C2 in a condition in which the accelerator opening of the vehicle detected by the accelerator opening detection sensor Se4 is decreasing.

The normal pressure boost rate of change c6 is determined depending on the running condition of the vehicle. In this example, the memory 41 includes a map that stores a relationship between the transmission torque of the lockup clutch 22 (torque outputted from the engine 11 and the rotating electric machine 12) and the normal pressure boost rate of change c6 and is the normal pressure boost rate of change c6 is acquired according to an actual transmission torque. More specifically, the normal pressure boost rate of change c6 is set to have a greater value at greater actual transmission torque values. The normal pressure boost rate of change c6 may be derived based on a predetermined arithmetic expression according to the actual transmission torque.

In this embodiment, the rapid pressure boost rate of change c6' is derived by performing an arithmetic operation, such as adding a predetermined value to the normal pressure boost rate of change c6 acquired as described above or multiplying the normal pressure boost rate of change c6 by a predetermined coefficient. At this time, the predetermined value and the predetermined coefficient may be a fixed value or a variable value varying according to, for example, the transmission torque or the accelerator opening of the vehicle. In this example, the rapid pressure boost rate of change c6' is derived by multiplying the normal pressure boost rate of change c6 by a coefficient of a predetermined value. A structure may also be made in which the rapid pressure boost rate of change c6' is defined according to the running condition of the vehicle, separately from the normal pressure boost rate of change c6. In this case, the memory 41 may have a map that stores a relationship between the transmission torque and the rapid pressure boost rate of change c6', so that the rapid pressure boost rate of change c6' may be acquired according to the actual transmission torque. Still another structure may derive the rapid pressure boost rate of change c6' based on a predetermined arithmetic expression according to the actual transmission torque, separately from the normal pressure boost rate of change c6.

The second control operation is performed after the upshift operation of the shift speed is completed, similarly as in the first control operation performed in the condition in which the accelerator opening is constant or increasing. The engagement pressure of the lockup clutch 22 is boosted at the normal pressure boost rate of change c6 for some time after the start of pressure boost. The engagement pressure of the lockup clutch 22 is changed from the normal pressure boost rate of change c6 to the rapid pressure boost rate of change c6' when the differential speed rN decreases to become equal to or less than the pressure boost permitting threshold value C2. The engagement pressure of the lockup clutch 22 is thereafter boosted at the rapid pressure boost rate of change c6'. The lockup clutch 22 is thereby engaged relatively at an early stage. The pressure boost control section 38 included in the control unit 31 performs the change from the normal pressure boost rate of change c6 to the rapid pressure boost rate of change c6'.

In this embodiment, in line with a decrease in the differential speed rN as a result of boosting the engagement pressure of the lockup clutch 22 from the condition in which the differential speed rN is equal to or more than the pressure boost permitting threshold value C2, the rotating electric machine control section 33 controls the output torque and the speed of the rotating electric machine 12 to thereby decrease the differential speed rN. Specifically, the rotating electric machine control section 33 decreases the differential speed rN by performing a feedback control based on the differential speed rN acquired by the differential speed acquisition section 36. In this embodiment, therefore, the rotating electric machine control section 33 functions also as "synchronous control unit".

The pressure boost permitting threshold value C2 that defines one of criteria for the condition for the pressure boost control section 38 to change the engagement pressure of the lockup clutch 22 from the normal pressure boost rate of change c6 to the rapid pressure boost rate of change c6' is set to a value of the differential speed rN that results in an impact when the lockup clutch 22 is engaged that is smaller than the impact on the vehicle generated by decreasing the accelerator opening. In this embodiment, the pressure boost permitting threshold value C2 is set to a value equal to the engagement permitting threshold value C1 described earlier. Specifically, the pressure boost permitting threshold value C2 is set to a value of the differential speed rN that results in the impact generated when the lockup clutch 22 is engaged is smaller than the impact generated when the accelerator opening is decreased.

Figure 8:
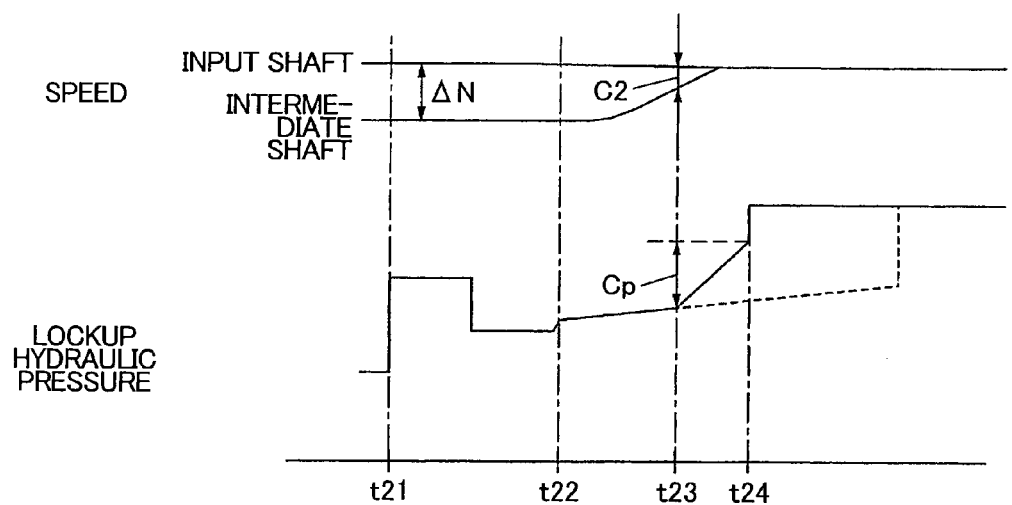
FIG. 8 is a timing chart for illustrating a second control operation according to the embodiment.

FIG. 8 is a timing chart for illustrating the second control operation. Shown in FIG. 8 are, in sequence from top to bottom, the speed of the input shaft I and the intermediate shaft M, and the hydraulic pressure controlled by the lockup control command signal S3. The differential speed rN is assumed to be equal to or less than the engagement permitting threshold value C1 and the pressure boost permitting threshold value C2 at early stages. Preliminary filling of the lockup clutch 22 with the hydraulic fluid is started at time t21. Starting at time t22 following the completion of the upshift operation of the shift speed (not shown) thereafter, the hydraulic pressure of the hydraulic fluid of the lockup clutch 22 is gradually boosted at the normal pressure boost rate of change c6. This gradually increases the rate at which the input shaft I and the intermediate shaft M rotate integrally with each other, thus gradually decreasing the differential speed rN. Then, when the differential speed rN becomes the pressure boost permitting threshold value C2 at time t23, the pressure boost control section 38 changes the pressure boost rate of change of the hydraulic pressure of the hydraulic fluid from the normal pressure boost rate of change c6 to the rapid pressure boost rate of change c6' which is set to a value greater than the normal pressure boost rate of change c6. The lockup control section 37 thereafter changes the engagement pressure of the lockup clutch 22 to the complete engagement pressure c7 at time t24 to shift the lockup clutch 22 into the completely engaged state, after the engagement pressure has been boosted by a predetermined pressure Cp at the rapid pressure boost rate of change c6' with reference to the engagement pressure at a point in time (time t23) at which the differential speed rN becomes the pressure boost permitting threshold value C2. Note that, in FIG. 8, the broken line shows changes in the hydraulic pressure when the hydraulic pressure of the hydraulic fluid relative to the lockup clutch 22 is boosted at the normal pressure boost rate of change c6 after the differential speed rN becomes equal to or less than the pressure boost permitting threshold value C2.

Similarly as described earlier, in the condition in which the accelerator opening is decreasing (specifically, the accelerator opening changes to the fully closed position) when the state determination section 34 determines the transition of the lockup clutch 22 from the disengaged state to the engaged state, the driver may thereafter perform a braking operation or operate otherwise to brake the vehicle. In accordance with the embodiment, in such cases, the pressure boost control section 38 changes the pressure boost rate of change of the hydraulic pressure of the hydraulic fluid from the normal pressure boost rate of change c6 to the rapid pressure boost rate of change c6' when the differential speed rN becomes the pressure boost permitting threshold value C2. This shortens the time required for the engagement pressure of the lockup clutch 22 to increase to a level sufficient to make the differential speed rN become a state of being nearly zero, so that a condition can be achieved at an early stage in which the torque transmitted from the wheel 16 is directly transmitted to the rotating electric machine 12 via the lockup clutch 22. A condition of performing regeneration at a high efficiency can therefore be achieved at an early stage. At this time, the pressure boost control section 38 increases the pressure boost rate of change only when the differential speed rN is equal to or less than the pressure boost permitting threshold value C2. Even if the lockup clutch 22 is engaged relatively suddenly, the impact on the vehicle generated as a result of the engagement operation of the lockup clutch 22 can be indistinguished from the impact on the vehicle generated by decreasing the accelerator opening.

The learning control section 39 is a functional section that corrects, based on setting values of one, or two or more variables in the engagement side control command signal S1 and an actual vehicle behavior when the shift speed is changed according to the setting values, the setting value of each of the variables of the subsequent engagement side control command signal S1 when the state determination section 34 determines a change of the shift speed and the shift control section 35 changes the shift speed. The learning control section 39 in this embodiment corresponds to "learning control unit" in the present invention. The variables subjected to a learning control performed by the learning control section 39 include at least one or more of the filling pressure a1 and the filling time a2 in the preliminary filling phase f1 and the target engagement pressure a5 in the pressure boost engagement phase f2 of the engagement side control command signal S1. In this example, the learning control section 39 applies each of all these items of the learning control to each of the engagement side friction engagement elements in each shift speed.

If, for example, either one or both of initial setting values of the filling pressure a1 and the filling time a2 in the preliminary filling phase f1 of the engagement side control command signal S1 are smaller than the filling pressure and the filling time when the shifting operation is performed at ideal timing, then the amount of hydraulic fluid preliminarily filled in the oil chamber of the engagement side friction engagement element is yet to be sufficient, so that torque transmission during shifting is retarded and results in a reduced output torque. If, on the other hand, either one or both of the initial setting values of the filling pressure a1 and the filling time a2 in the preliminary filling phase f1 of the engagement side control command signal S1 are greater than the filling pressure and the filling time when the shifting operation is performed at the ideal timing, then the amount of hydraulic fluid preliminarily filled in the oil chamber of the engagement side friction engagement element becomes excessive, so that so-called bind-up is invited and results in a reduced output torque.

In addition, if, for example, the initial setting value of the target engagement pressure a5 in the pressure boost engagement phase f2 of the engagement side control command signal S1 is smaller than the target engagement pressure when the shifting operation is performed at the ideal timing, then torque capacity becomes insufficient and the shifting operation is excessively prolonged. If, on the other hand, the initial setting value of the target engagement pressure a5 in the pressure boost engagement phase f2 of the engagement side control command signal S1 is greater than the target engagement pressure when the shifting operation is performed at the ideal timing, then the torque capacity becomes excessive and the shifting operation is performed abruptly, causing a shock to occur.

If the shifting operation is performed according to the engagement side control command signal S1 and the disengagement side control command signal S2, therefore, the learning control section 39 corrects the initial setting values of the filling pressure a1, the filling time a2, and the target engagement pressure a5 based on the actual vehicle behavior so that the output torque can be inhibited from being reduced during subsequent shifting operations or the shifting operations can be performed promptly and smoothly. Each of the corrected command parameters 44 is stored in the memory 41 and referred to by the shift control section 35 during subsequent shifting operations. This enables prompt and smooth shifting operations, while inhibiting reduction in the output torque, even with, for example, manufacturing variations and deterioration with time of the engine 11 and the transmission 14.

In accordance with this embodiment, if the upshift operation of the shift speed and the engagement of the lockup clutch 22 are performed in the condition of a decreasing accelerator opening in the first control operation, the learning control section 39 retains the setting value of each of the command parameters 44 of the engagement side control command signal S1 as they are. Specifically, the lockup clutch 22 is engaged at an early stage, in such cases, with priority given to increasing the regeneration efficiency and it is expected that impact of some magnitude is given to the vehicle through the shifting operation, so that the variables are exempted from the learning control. This prevents the setting value of each of the command parameters 44 of the engagement side control command signal S1 from being corrected to an inappropriate value. For the same reason, the learning control section 39 also retains the setting value of each of the command parameters 44 of the engagement side control command signal S1 as they are when the second control operation is performed.

4. Control Operation Procedures

Figure 9:
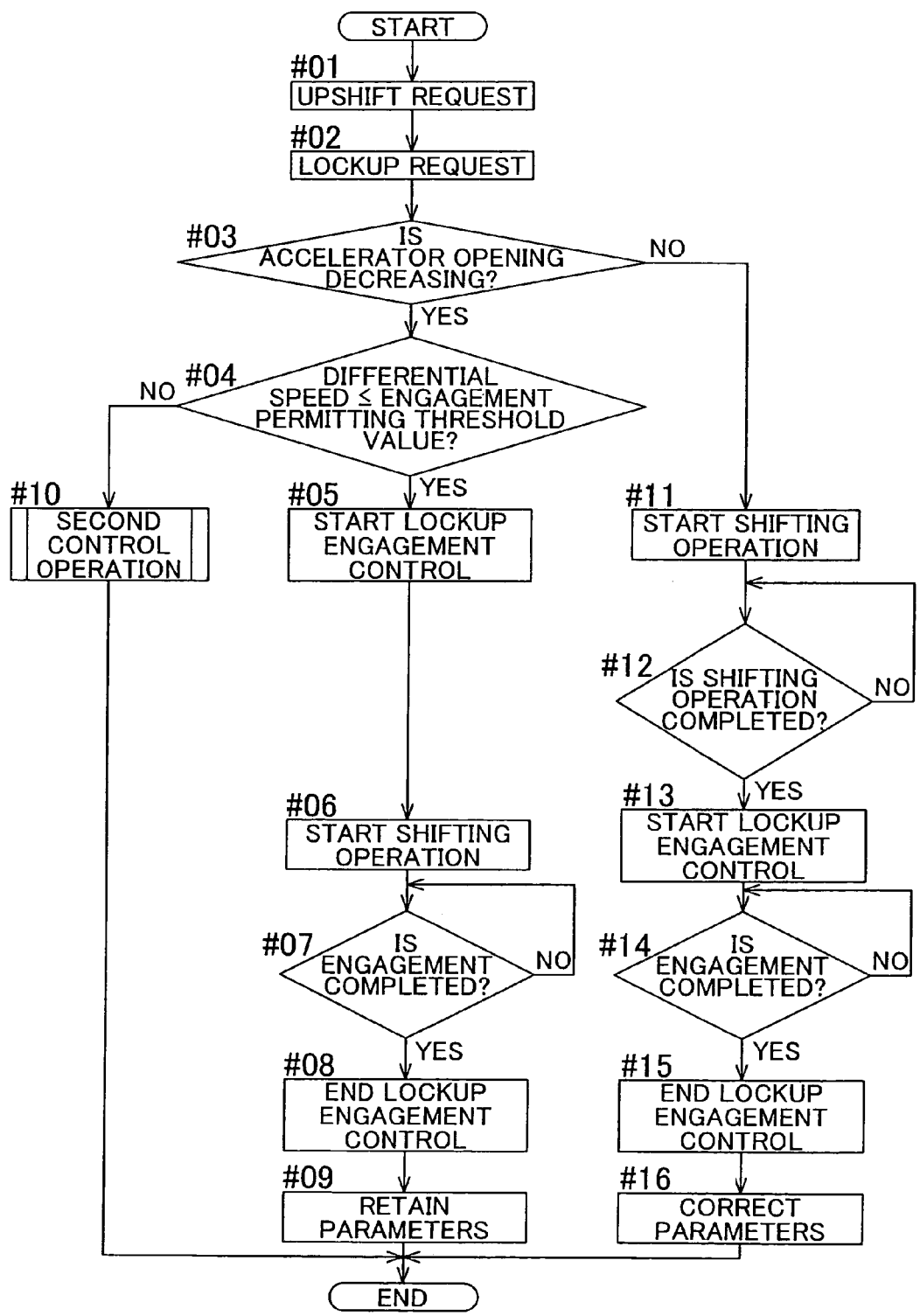
FIG. 9 is a flowchart for illustrating procedures of the first control operation according to the embodiment.
Figure 10:
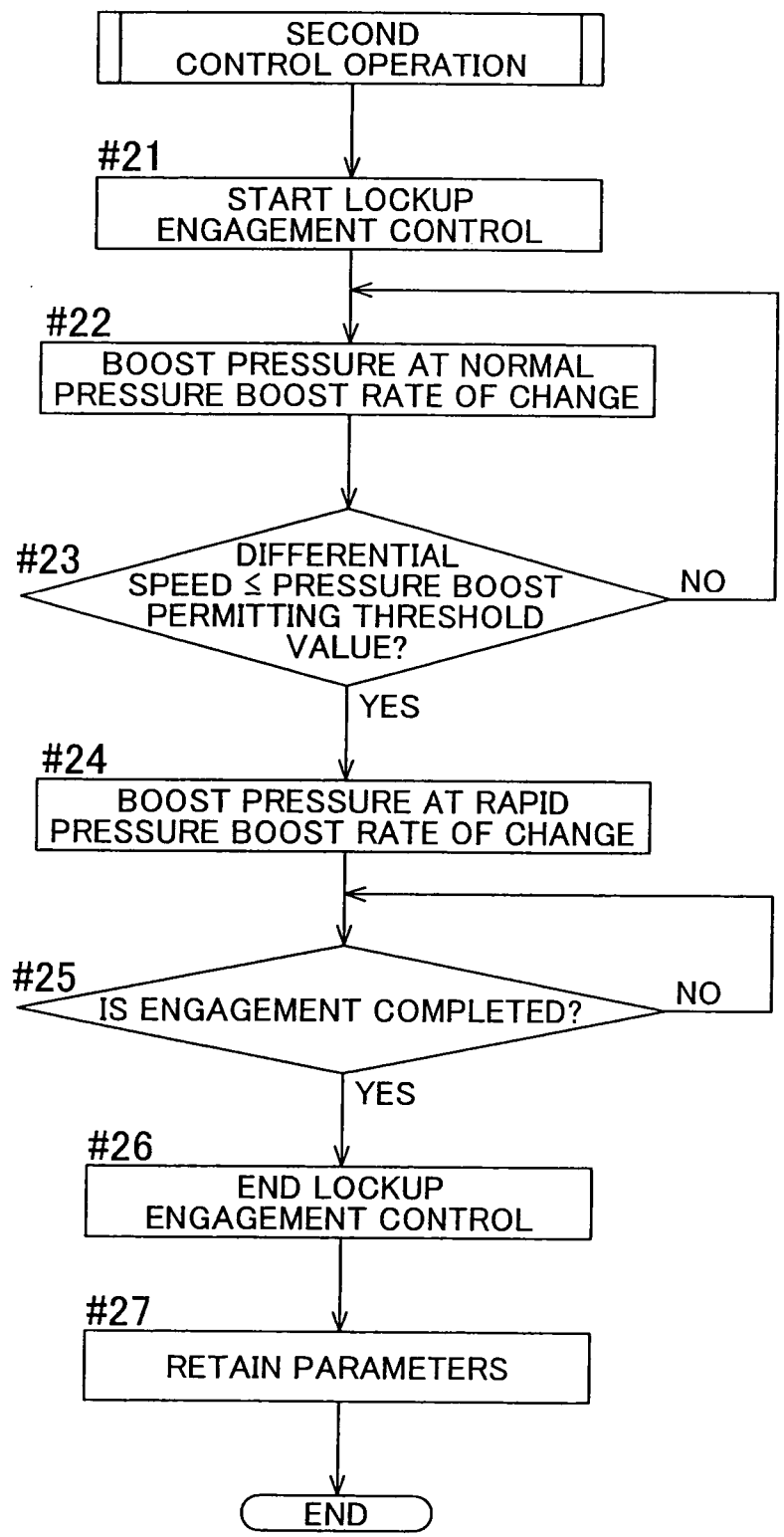
FIG. 10 is a flowchart for illustrating procedures of the second control operation according to the embodiment.

Details of the control of the vehicle drive system 1 according to the embodiment will be described below. FIG. 9 is a flowchart for illustrating procedures of the control operation (the first control operation) of the vehicle drive system 1 according to the embodiment. FIG. 10 is a flowchart for illustrating procedures of the second control operation in step #10 of FIG. 9. The control operation procedures of the vehicle drive system 1 described below are performed by each of the functional sections 32 to 39 of the control unit 31. If each of the functional sections 32 to 39 of the control unit 31 is structured of a program, the arithmetic operation unit included in the control unit 31 operates as a computer that executes the program structuring each of the functional sections 32 to 39.

4-1. Procedures of the First Control Operation

In the first control operation according to the embodiment, when the state determination section 34 determines the upshift of the shift speed and the transition of the lockup clutch 22 from the disengaged state to the engaged state (steps #01 and #02), the lockup control section 37 determines whether the accelerator opening detected by the accelerator opening detection sensor Se4 is decreasing or not (step #03). If it is determined that the accelerator opening is decreasing (step #03: Yes), the lockup control section 37 determines whether the differential speed rN between the input shaft I and the intermediate shaft M acquired by the differential speed acquisition section 36 is equal to or less than the engagement permitting threshold value C1 or not (step #04). If it is determined that the differential speed rN is more than the engagement permitting threshold value C1 (step #04: No), the lockup control section 37 performs the second control operation (step #10). Details of the second control operation will be described later. If it is determined that the differential speed rN is equal to or less than the engagement permitting threshold value C1 (step #04: Yes), on the other hand, the lockup control section 37 starts the engagement control of the lockup clutch 22 (step #05).

Thereafter (or at the same time), the shifting operation in the transmission 14 by the shift control section 35 is started (step #06). At this time, the engagement operation of the lockup clutch 22 is immediately started regardless of the shifting operation as described earlier and the lockup clutch 22 is engaged regardless of whether the shifting operation in the transmission 14 is completed or not. Then, determining a lapse of a predetermined period of time using a built-in timer (step #07: Yes), the lockup control section 37 terminates the lockup engagement control (step #08). The learning control section 39 then terminates the first control operation, while retaining the setting value of each of the command parameters 44 of the engagement side control command signal S1 as they are (step #09).

If, on the other hand, it is determined in step #03 that the accelerator opening is not decreasing, specifically, is constant or increasing (step #03: No), the shifting operation in the transmission 14 by the shift control section 35 is started (step #11). When the engagement pressure of the engagement side friction element in the transmission 14 thereafter becomes the complete engagement pressure to complete the shifting operation (step #12: Yes), the lockup control section 37 starts the engagement control of the lockup clutch 22 (step #13). The engagement control of the lockup clutch 22 here refers to a series of operation performed on the hydraulic fluid that has been preliminarily filled to boost the hydraulic pressure to the eventual complete engagement pressure from the disengaged state by way of the half-engaged state. The preliminary filling may therefore be performed before the shifting operation is completed. When determining that the predetermined period of time has elapsed with the built-in timer (step #14: Yes), the lockup control section 37 terminates the lockup engagement control (step #15). The learning control section 39 then corrects the setting value of each of the command parameters 44 of the engagement side control command signal S1 based on an actual vehicle behavior (step #16) and terminates the first control operation.

4-2. Procedures of the Second Control Operation

Detailed procedures of the second control operation of step #10 will be described below. In the second control operation according to this embodiment, the lockup control section 37 first starts the engagement control of the lockup clutch 22 (step #21). Here, the hydraulic fluid is preliminarily filled in the oil chamber of the lockup clutch 22 and then the hydraulic pressure of the hydraulic fluid is gradually boosted at the normal pressure boost rate of change c6 (step #22). This gradually increases the engagement pressure of the lockup clutch 22 and decreases the differential speed rN. In this embodiment, the differential speed rN is decreased also by the rotating electric machine control section 33 simultaneously controlling the output torque and the speed of the rotating electric machine 12. When the differential speed rN thereafter becomes equal to or less than the pressure boost permitting threshold value C2 (step #23: Yes), the pressure boost control section 38 changes the pressure boost rate of change of the hydraulic pressure of the hydraulic fluid from the normal pressure boost rate of change c6 to the rapid pressure boost rate of change c6' (step #24). This results in the hydraulic pressure of the hydraulic fluid being rapidly boosted at the rapid pressure boost rate of change c6'. When the pressure is boosted by the predetermined pressure Cp at the rapid pressure boost rate of change c6' with reference to the engagement pressure at the point in time at which the differential speed rN becomes the pressure boost permitting threshold value C2 (step #25: Yes), the lockup control section 37 changes the engagement pressure of the lockup clutch 22 to the complete engagement pressure c7 to terminate the lockup engagement control (step #26). The learning control section 39 then retains the setting value of each of the command parameters 44 of the engagement side control command signal S1 as they are (step #27) and terminates the second control operation.

Miscellaneous Embodiments (1) The above-described embodiment has been described as an example, in which, substantially at the same time that the state determination section 34 determines the transition of the lockup clutch 22 from the disengaged state to the engaged state, the lockup control section 37 outputs the lockup control command signal S3 to let the preliminary operation performed immediately. However, the embodiment of the present invention is not limited to this example. Specifically, a structure, in which the lockup control section 37 boosts the hydraulic pressure of the hydraulic fluid to engage the lockup clutch 22 at least before the upshift operation of the shift speed is completed, can achieve at an early stage a condition in which the rotating electric machine 12 performs regeneration at high efficiency. This allows the object of the present invention to be achieved.

(2) The above-described embodiment has been described for an example, in which each of the engagement side control command signal S1, the disengagement side control command signal S2, and the lockup control command signal S3 is generated by a corresponding predetermined reference waveform's being defined by the plurality of command parameters 44 (specifically, a1 to a9, b1 to b3, and c1 to c7). However, the embodiment of the present invention is not limited to this example. Specifically, the control command signals S1 to S3 defined by the command parameters 44 described above are only an example and another preferred embodiment of the present invention may further simplify the control command signals S1 to S3 by decreasing the number of the command parameters 44 or further elaborate the control command signals S1 to S3 by increasing the number of the command parameters 44.

(3) The above-described embodiment has been described for an example, in which, in the first control operation, when the lockup clutch 22 is to be engaged, the hydraulic pressure of the hydraulic fluid is boosted at an equivalent pressure boost rate of change regardless of the position of the accelerator opening (both in the condition in which the accelerator opening is decreasing and in the condition in which the accelerator opening is constant or increasing). However, the embodiment of the present invention is not limited to this example. Specifically, when the first control operation is to be performed in the condition in which the accelerator opening is decreasing, a structure may be made as another preferred embodiment of the present invention, in which the lockup control section 37 makes, in its attempt to engage the lockup clutch 22 in the condition in which the upshift operation of the shift speed is yet to be completed, the pressure boost rate of change of the pressure boost engagement phase F2 in the lockup control command signal S3 greater than the pressure boost rate of change in the condition in which the accelerator opening is constant or increasing. Specifically, when the lockup clutch 22 is to be engaged in the condition in which the upshift operation of the shift speed is yet to be completed, it is assumed that the accelerator opening is decreasing and the differential speed rN is equal to or less than the engagement permitting threshold value C1. Consequently, when the pressure boost permitting threshold value C2 is equal to the engagement permitting threshold value C1 or the pressure boost permitting threshold value C2 is greater than the engagement permitting threshold value C1 as in the above example, it follows that the condition for boosting the hydraulic pressure of the hydraulic fluid of the lockup clutch 22 at the rapid pressure boost rate of change c6' is simultaneously satisfied in the second control operation. Alternatively, if the difference between the pressure boost permitting threshold value C2 and the engagement permitting threshold value C1 is extremely small should the pressure boost permitting threshold value C2 be smaller than the engagement permitting threshold value C1, the condition for boosting the hydraulic pressure of the hydraulic fluid of the lockup clutch 22 at the rapid pressure boost rate of change c6' is very often simultaneously satisfied in the second control operation. Then, a condition can be achieved at an early stage, in which the torque transmitted from the wheel 16 is directly transmitted to the rotating electric machine 12 via the lockup clutch 22 by boosting the pressure boost engagement phase F2 in the lockup control command signal S3 at the rapid pressure boost rate of change c6'. The condition in which the rotating electric machine 12 can perform regeneration at high efficiency can therefore be achieved at an even earlier stage.

(4) The above-described embodiment has been described for an example, in which the transmission 14 has three shift speeds with varying gear ratios (the first speed, the second speed, and the third speed). However, the embodiment of the present invention is not limited to this example. Specifically, the number of shift speeds is not specified as long as a stepped transmission is used. A preferred embodiment of the present invention may therefore have a structure of having two shift speeds, or even four or more shift speeds.

(5) The above-described embodiment has been described for an example, in which the transmission 14 is structured to include the planetary gear set having one or two or more planetary gear mechanisms and a plurality of friction engagement elements, such as a clutch or a brake, for selecting a shift speed by engaging or disengaging a rotary element of the planetary gear set. However, the embodiment of the present invention is not limited to this example. Specifically, another preferred embodiment of the present invention may, for example, have a transmission 14 that includes a plurality of gear trains fixed to a parallel shaft, each set of meshing gears being changed to select the shift speed.

(6) The above-described embodiment has been described for an example, in which the vehicle drive system 1 is arranged to include the input shaft I, the intermediate shaft M, and the output shaft O coaxially disposed to form a single shaft structure. However, the embodiment of the present invention is not limited to this example. Specifically, another preferred embodiment of the present invention may be applied, for example, to a vehicle drive system 1 having the input shaft I and the intermediate shaft M disposed on a shaft different from that on which the output shaft O is disposed.

The present invention can be suitably applied to a control apparatus for controlling a vehicle drive system that has a fluid coupling including a direct connection clutch, and a transmission, and that outputs rotation of an input member that is drivingly connected to an engine and a rotating electric machine to an output member.

What is claimed is:

1. A control apparatus that controls a vehicle drive system that has a fluid coupling including a direct connection clutch, and a transmission and outputs rotation of an input member that is drivingly connected to an engine and a rotating electric machine to an output member, the control apparatus comprising:
a differential speed acquisition unit that acquires a differential speed representing a difference in speed between an input side drivingly connected to the input member of the fluid coupling and an output side drivingly connected to the transmission;
a state determination unit that determines a shift speed in the transmission and an operating state of the direct connection clutch based on an accelerator opening and a vehicle speed of a vehicle; and
a direct connection control unit that engages, if the differential speed is equal to or less than a predetermined engagement permitting threshold value when the state determination unit determines an upshift of the shift speed and a transition from a disengaged state to an engaged state of the direct connection clutch in a condition in which the accelerator opening is decreasing, the direct connection clutch regardless of an upshift operation of the shift speed, wherein:
the direct connection control unit engages the direct connection clutch after the upshift operation of the shift speed is completed, if the state determination unit determines the upshift of the shift speed and the transition from the disengaged state to the engaged state of the direct connection clutch in a condition in which the accelerator opening is constant or increasing.

2. The control apparatus according to claim 1, wherein:
the direct connection control unit causes a preliminary operation in which the direct connection clutch is set into an engageable state and an engagement operation in which the direct connection clutch is engaged after the preliminary operation to be performed.

3. The control apparatus according to claim 2, wherein:
the direct connection control unit causes, if the differential speed is equal to or less than a predetermined engagement permitting threshold value when the state determination unit determines the upshift of the shift speed and the transition from the disengaged state to the engaged state of the direct connection clutch in a condition in which the accelerator opening is decreasing, the preliminary operation to be performed substantially at the same time that the state determination unit determines the transition from the disengaged state to the engaged state of the direct connection clutch.

4. The control apparatus according to claim 1, wherein:
the engagement permitting threshold value is set to a value of the differential speed that results in an impact when the direct connection clutch is engaged that is smaller than an impact on the vehicle generated by decreasing the accelerator opening.

5. The control apparatus according to claim 1, wherein:
the direct connection control unit outputs a direct connection control command signal for engaging the direct connection clutch; and
the direct connection control command signal is a predetermined reference waveform defined by one or two or more variables, the reference waveform having a preliminary filling phase for filling an engagement side oil chamber of the direct connection clutch with a hydraulic fluid and a pressure boost engagement phase for engaging the direct connection clutch by boosting a hydraulic pressure of the hydraulic fluid.

6. The control apparatus according to claim 5, wherein:
the direct connection control unit makes a pressure boost rate of change of the pressure boost engagement phase in the direct connection control command signal when the direct connection clutch is to be engaged in a condition in which the upshift operation of the shift speed is yet to be completed greater than a pressure boost rate of change in the condition in which the accelerator opening is constant or increasing.

7. The control apparatus according to claim 1, wherein:
the transmission includes a plurality of friction engagement elements for achieving each shift speed, the plurality of friction engagement elements being controlled to be engaged and disengaged according to an engagement side control command signal and a disengagement side control command signal, respectively; and
the engagement side control command signal is a predetermined reference waveform defined by one or two or more variables, the reference waveform having a preliminary filling phase for filling an oil chamber on an engagement side of the friction engagement element with a hydraulic fluid and a pressure boost engagement phase for engaging the friction engagement element by boosting a hydraulic pressure of the hydraulic fluid;
the control apparatus further comprising:
a learning control unit correcting, based on setting values of the one, or two or more variables and an actual vehicle behavior when the shift speed is changed according to the setting values, the setting value of each of the variables of the subsequent engagement side control command signal when the state determination unit determines a change of the shift speed and the shift speed is changed.

8. The control apparatus according to claim 7, wherein:
the learning control unit retains the setting value of each of the variables of the engagement side control command signal as they are, if the upshift operation of the shift speed and engagement of the direct connection clutch are performed in a condition in which the accelerator opening is decreasing.

9. The control apparatus according to claim 7, wherein:
the variable includes at least one or more of a filling pressure and a filling time in the preliminary filling phase of the engagement side control command signal and a target engagement pressure in the pressure boost engagement phase.

* * * * *